United States Patent
Kiiskinen et al.

(10) Patent No.: US 7,490,341 B2
(45) Date of Patent: Feb. 10, 2009

(54) SYSTEM AND ASSOCIATED TERMINAL, METHOD AND COMPUTER PROGRAM PRODUCT FOR DIRECTIONAL CHANNEL BROWSING OF BROADCAST CONTENT

(75) Inventors: Arto Kiiskinen, Espoo (FI); Arjun Krishnan, Plano, TX (US)

(73) Assignee: Nokia Corporation, Espoo (FI)

( * ) Notice: Subject to any disclaimer, the term of this patent is extended or adjusted under 35 U.S.C. 154(b) by 680 days.

(21) Appl. No.: 11/146,876

(22) Filed: Jun. 7, 2005

(65) Prior Publication Data

US 2006/0277582 A1  Dec. 7, 2006

(51) Int. Cl.
*G06F 3/00* (2006.01)
*G06F 13/00* (2006.01)
*H04N 5/445* (2006.01)

(52) U.S. Cl. .................. 725/38; 725/120; 725/134; 348/731

(58) Field of Classification Search ............... 725/25, 725/27, 46, 47, 89, 94, 114, 144, 38, 52, 725/56, 120, 134, 142; 348/731
See application file for complete search history.

(56) References Cited

U.S. PATENT DOCUMENTS

| | | | |
|---|---|---|---|
| 5,886,690 A | 3/1999 | Pond et al. | |
| 6,028,599 A | 2/2000 | Yuen et al. | |
| 6,118,498 A * | 9/2000 | Reitmeier | 348/725 |
| 6,661,468 B2 * | 12/2003 | Alten et al. | 348/569 |
| 2002/0116471 A1 | 8/2002 | Shteyn | |
| 2002/0166128 A1 | 11/2002 | Ikeda et al. | |
| 2003/0152107 A1 | 8/2003 | Pekonen | |
| 2003/0163814 A1 | 8/2003 | Hayakawa | |
| 2003/0166392 A1 | 9/2003 | Laiho et al. | |
| 2004/0055011 A1 | 3/2004 | Bae et al. | |
| 2004/0056985 A1 | 3/2004 | Seong | |
| 2004/0268382 A1 * | 12/2004 | Kim | 725/25 |

(Continued)

FOREIGN PATENT DOCUMENTS

EP    0 889 645 A2    1/1999

(Continued)

OTHER PUBLICATIONS

Brad A Myers, Dario A. Giuse, Roger B. Dannenberg, Brad Vander Zanden, David S. Kosbie, Edward Pervin, Andrew Mickish, Philippe Marchal; *Garnet—Comprehensive Support for Graphical, Highly Interactive User Interfaces*; Nov. 1990; pp. 71-85; IEEE.

*Primary Examiner*—Ngoc K Vu
(74) *Attorney, Agent, or Firm*—Alston & Bird LLP

(57) ABSTRACT

A system for providing broadcast content includes at least one content source for broadcasting content, and at least one terminal. The terminal can receive and consume content for a selected channel x, which is one in a set of ordered channels of broadcast content. The terminal can also change channels from the selected channel x to an adjacent channel x±1 in the set of n ordered channels. In response to changing channels to the adjacent channel x±1, the terminal can receive and consume content for the adjacent channel x±1. The terminal can receive and store content for Y next adjacent channels (x±1) ±y, y=1, . . . , Y in buffer memory. Content for the next adjacent channels is stored based upon the direction the channel is changed and in response to changing channels.

25 Claims, 11 Drawing Sheets

U.S. PATENT DOCUMENTS

| | | |
|---|---|---|
| 2005/0047426 A1 | 3/2005 | Aaltonen et al. |
| 2005/0091680 A1* | 4/2005 | Kondo .................. 725/12 |
| 2005/0091683 A1 | 4/2005 | Sheynman et al. |
| 2005/0240967 A1 | 10/2005 | Anderson et al. |
| 2005/0273819 A1* | 12/2005 | Knudson et al. .............. 725/58 |
| 2006/0174301 A1 | 8/2006 | Hashimoto et al. |

FOREIGN PATENT DOCUMENTS

| | | |
|---|---|---|
| EP | 1 091 575 A1 | 4/2001 |
| EP | 1 185 087 A2 | 3/2002 |
| EP | 1 023 807 A1 | 7/2002 |
| EP | 1 023 807 B1 | 7/2002 |
| EP | 1 638 334 A1 | 3/2006 |
| WO | WO 99/20049 | 4/1999 |
| WO | WO 00/05889 | 2/2000 |
| WO | WO 00/70876 | 11/2000 |
| WO | WO 02/43382 A1 | 5/2002 |
| WO | WO 2004/056096 A1 | 7/2004 |
| WO | WO 2005/002151 A1 | 1/2005 |
| WO | WO 2005/022791 A1 | 3/2005 |
| WO | WO 2006/031925 A2 | 3/2005 |
| WO | WO 2005/045603 A2 | 5/2005 |
| WO | WO 2005/0057930 A1 | 6/2005 |
| WO | WO 2006131808 A2 | 12/2006 |

* cited by examiner

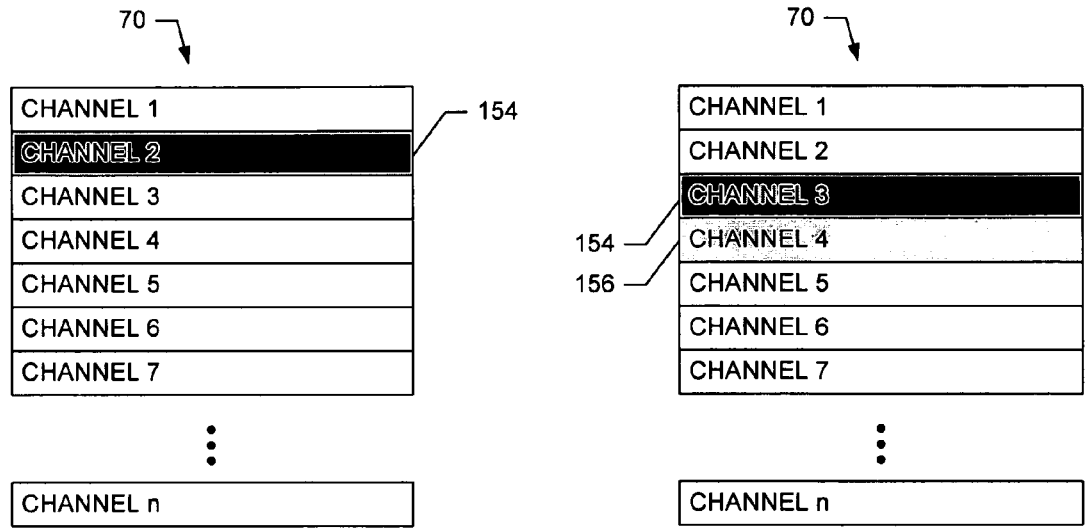
FIG. 9a.
FIG. 9b.
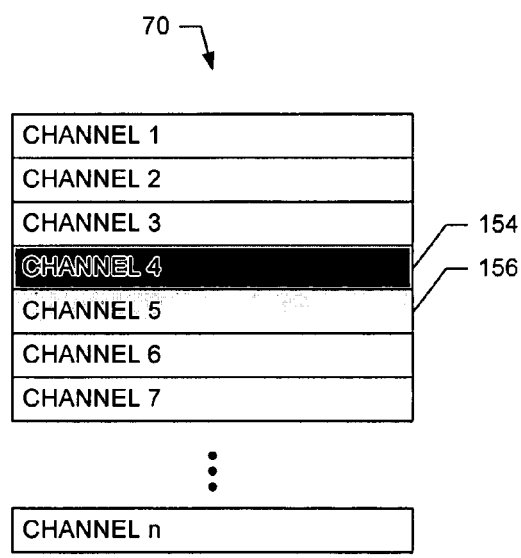
FIG. 9c.

# US 7,490,341 B2

SYSTEM AND ASSOCIATED TERMINAL, METHOD AND COMPUTER PROGRAM PRODUCT FOR DIRECTIONAL CHANNEL BROWSING OF BROADCAST CONTENT

FIELD OF THE INVENTION

The present invention generally relates to systems and methods for providing broadcast content and, more particularly, to systems, terminals, methods and computer program products for channel browsing broadcast content.

BACKGROUND OF THE INVENTION

The deployment of advanced high bit-rate mobile networks has opened up new opportunities for delivering a host of services in a way that was not possible with earlier second generation wireless networks. Recent systems including third generation (3G) systems, such as those specified for use with the Global System for Mobile Communications (GSM) wireless standard, enable the delivery of new digital services such as video calls and the playback of multimedia applications that are comprised of audio and video clips. In this regard, the increased bit rates of 3G systems widen the possibilities for providing digital services.

The increased bit rates of 3G systems provide adequate performance for delivering high quality digital audio and acceptable quality moving image clips. However, at these transfer rates it may be difficult to handle exceedingly high data intensive tasks such as delivering high quality full-motion video and transferring very large data files to mobile terminals. In this regard, attempts at downloading large data files may lead to inconveniently long downloading times that can be undesirably costly for users. For this and other reasons, alternative broadband delivery techniques have been investigated that could provide a practical solution for high data intensive tasks in terms of lower cost and convenience for the users involved.

One such delivery technique that has shown promise is Digital Video Broadcasting (DVB). In this regard, DVB-T, which is related to DVB-C (cable) and DVB-S (satellite), is the terrestrial variant of the DVB standard. As is well known, DVB-T is a wireless point-to-multipoint data delivery mechanism developed for digital TV broadcasting, and is based on the MPEG-2 transport stream for the transmission of video and synchronized audio. DVB-T has the capability of efficiently transmitting large amounts of data over a broadcast channel to a high number of users at a lower cost, when compared to data transmission through mobile telecommunication networks using, e.g., 3G systems. Advantageously, DVB-T has also proven to be exceptionally robust in that it provides increased performance in geographic conditions that would normally affect other types of transmissions, such as the rapid changes of reception conditions, and hilly and mountainous terrain. On the other hand, DVB-H (handheld), which is also related to DVB-T, can provide such increased performance particularly for wireless data delivery to handheld devices.

Digital broadband data broadcast networks are known. As mentioned, an example of such a network enjoying popularity in Europe and elsewhere world-wide is DVB which, in addition to the delivery of television content, is capable of delivering data, such as Internet Protocol (IP) data. Other examples of broadband data broadcast networks include Japanese Terrestrial Integrated Service Digital Broadcasting (ISDB-T), Digital Audio Broadcasting (DAB), and MBMS, and those networks provided by the Advanced Television Systems Committee (ATSC). In many such systems, a containerization technique is utilized in which content for transmission is placed into MPEG-2 packets which act as data containers. Thus, the containers can be utilized to transport any suitably digitized data including, but not limited to High Definition TV, multiple channel Standard definition TV (PAUNTSC or SECAM) and, of course, broadband multimedia data and interactive services.

The combined use of mobile telecommunications with a broadband delivery technique such as DVB-T has been proposed in the past in order to achieve efficient delivery of digital services to users on the move. This would take advantage of existing infrastructures in the effort to provide personal communications (already prevalent) and the growing demand for Internet access, together with the expected rise of digital broadcasting, so that users can receive these services with a single device. Furthermore, DVB-T is a cross platform standard that is shared by many countries thereby making frequency compatibility and roaming less of an issue. The combination of mobile telecommunication and relatively very low cost digital broadband delivery techniques provides the possibility of interactive services such as uni-directional and bi-directional services such as audio and video streaming (e.g., TV, radio, etc.), file downloads and advanced gaming applications, etc.

It is contemplated that digital broadband data broadcast networks will be used to broadcast content for one or more television, radio and/or data channels. For example, it is contemplated that mobile television DVB-H broadcasts will include content for 10-50 or more television channels. In various instances, such content is broadcast in bursts each of which includes time-sliced content for a plurality of channels. This broadcasting of channels in time slices achieves power saving in mobile devices by permitting such devices to power up to receive a burst of time-sliced content for a number of channels, and then power down for the typically longer time period between bursts.

As will be appreciated, when a plurality of available channels of content are broadcast, the user may desire to browse through the available channels to select a desired channel to receive and consume (e.g., display, play, etc.). Such browsing, often referred to as "channel hopping," generally includes the user moving from one channel to the next one by one, selecting each channel so that the user briefly receives content for the selected channel until the moving on to the next channel. By briefly receiving content for a selected channel, the user can assess the received content, and decide to either continue to receive that content (ceasing to channel hop), or move on to the next channel.

As will also be appreciated, because channels may be broadcast in bursts that include time-sliced content for those channels, users moving from one channel to the next may experience a time delay (i.e., channel tuning time) dependent upon the burst interval as well as a number of other delays. Undesirably, such time delays can last up to ten seconds or more. To decrease this time delay, however, techniques have been developed to buffer content for channels on either side of the currently selected channel into memory of the user device. In accordance with such techniques, then, users receive content for three channels, as opposed to one channel, with one channel of content being consumed and the other two being buffered in memory. Thus, if the user moves on to the next channel, that channel's content can initially be pulled from the buffer memory to avoid the time delay of waiting until the next burst interval to receive its content. But while such buffering may reduce the delay associated with channel hopping from one channel to the next, it also reduces the power saving benefits of broadcasting channels in time-sliced bursts, and may not even be possible to fully achieve with current receiver performance.

SUMMARY OF THE INVENTION

In light of the foregoing background, exemplary embodiments of the present invention provide an improved system and associated terminal, method and computer program product for directional channel browsing of broadcast content. Exemplary embodiments of the present invention controllably buffer content of one or more channels of content in a manner that decreases the delay associated with channel hopping without incurring the reduction in power saving experienced in buffering channels on either side of a selected channel. In this regard, the terminal of exemplary embodiments of the present invention includes a buffer memory that typically remains empty while the terminal receives and consumes content for a selected channel, where the selected channel is one of a plurality of ordered channels.

When the terminal user selects a channel adjacent the selected channel, thereby initiating a channel hopping sequence, the terminal begins to buffer content for one or more next adjacent channels in the same direction from the selected channel. Exemplary embodiments of the present invention are therefore capable of at least partially buffering channels of content during channel hopping, without requiring the terminal to continuously buffer channels on either side of a selected channel. Then, when the terminal user ends the channel hopping sequence, the terminal can clear the buffer and operate without it until the terminal user again begins to channel hop. Thus, exemplary embodiments of the present invention are also capable of achieving the full benefits of power saving resulting from delivering content in time-sliced bursts while the terminal user is not channel hopping.

According to one aspect of the present invention, a system is provided for providing broadcast content. The system includes at least one content source capable of broadcasting content. In addition, the system includes at least one terminal capable of receiving and consuming content for a selected channel $x$, where the content for the selected channel is received from the content source, and where the selected channel is one in a set of ordered channels of broadcast content. The terminal is also capable of changing channels from the selected channel $x$ to an adjacent channel $x \pm 1$ in the set of ordered channels, thereby changing the channel in a given direction from the selected channel $x$.

In response to changing channels to the adjacent channel $x \pm 1$, the terminal is capable of receiving and consuming content for the adjacent channel $x \pm 1$. In addition, as content for the adjacent channel is received and consumed, the terminal is capable of receiving and storing content for Y next adjacent channels $(x \pm 1) \pm y$, $y=1, \ldots, Y$ in buffer memory. In this regard, content for the next adjacent channels is received and stored based upon the direction in which the channel is changed and in response to changing channels to the adjacent channel. Thus, if the channel is changed from the adjacent channel $x \pm 1$ to a channel other than the next adjacent channel $(x \pm 1) \pm y$, the terminal can be further capable of receiving and consuming content for the channel other than the next adjacent channel independent of the stored content. On the other hand, if the channel is changed from the adjacent channel $x \pm 1$ to the next adjacent channel $(x \pm 1) \pm y$, the terminal can be further capable of consuming the stored content for the next adjacent channel, and thereafter receiving and consuming content for the next adjacent channel.

The terminal can be capable of operating at one or more instances to receive and consume content for the selected channel $x$, change channels from the selected channel $x$ to the adjacent channel $x \pm 1$, receive and consume content for the adjacent channel $x \pm 1$, and receive and store content for the next adjacent channels $(x \pm 1) \pm y$. In such instances where the terminal operates in a plurality of such instances, then, the adjacent channel $x \pm 1$ of one instance becomes the selected channel $x$ for a next instance such that $x=x \pm 1$ from one instance to the next. Also in such instances, the terminal can be further capable of initiating a buffer timeout after changing channels from the selected channel $x$ to the adjacent channel $x \pm 1$, where initiating the buffer timeout includes resetting the buffer timeout for each subsequent instance of changing channels. Accordingly, the terminal can be capable of ceasing receipt and storage of content for Y next adjacent channels $(x \pm 1) \pm y$, $y=1, \ldots, Y$ in buffer memory if the buffer timeout expires before being reset for a subsequent instance of changing channels. Also in such instances, the terminal can be further capable of clearing the buffer memory.

In addition to storing content for the next adjacent channels $(x \pm 1) \pm y$, the terminal can be further capable of receiving and storing content for at least one preferred channel in buffer memory, where the preferred channel(s) are defined based upon at least one channel usage statistic. Further, the terminal can be capable of receiving a selection of content for one or more channels scheduled for broadcast at one or more future broadcast times, and presenting a reminder of an impending broadcast of the selected content before the scheduled broadcast. In such instances, the terminal can be further capable of receiving and storing the selected content based upon presentation of the reminder of impending broadcast of the respective content.

The selected channel and channel to which the selected channel is changed can be channels in a set of n ordered channels of content broadcast by the content source. However, the terminal can be capable of altering the channels in the set of n ordered channels and/or the ordering of the channels in the set or n ordered channels to thereby form a user-defined set of $\leq n$ ordered channels. In such instances, the terminal can be capable of receiving and consuming content for a selected channel in the user-defined set of $\leq n$ ordered channels. In addition, the terminal can be capable of changing channels to an adjacent channel $x \pm 1$ in the user-defined set of $\leq n$ ordered channels.

In various instances, the terminal user may subscribe to fewer than all of the channels in the set of channels. In such instances, the terminal can be capable of receiving and consuming content including an indication that the adjacent channel $x \pm 1$ comprises an unsubscribed channel, and/or other content reflective of the adjacent channel being an unsubscribed channel. Also in such instances, the terminal can be capable of receiving and storing content for Y next adjacent subscribed channels $(x \pm 1) \pm y$, $y=1, \ldots, Y$ in buffer memory. Thus, the terminal can be capable of bypassing any unsubscribed next adjacent channel(s) that are intervening between the adjacent channel and the next adjacent subscribed channel(s).

According to other aspects of the present invention, a terminal, method and computer program product are provided for receiving broadcast content. Therefore, exemplary embodiments of the present invention provide an improved system and associated terminal, method and computer program product for providing broadcast content. In this regard, the terminal of exemplary embodiments of the present invention is capable of controllably buffering content for one or more channels of content during channel hopping based upon a direction the channels are being changed. Then, after completion of the channel hopping sequence, indicated by expiration of the buffer timeout, the terminal is capable of ceasing buffering of content and, if so desired, clearing the buffer. Therefore, the system and associated terminal, method and computer program product of exemplary embodiments of the present invention solve the problems identified by prior techniques and provide additional advantages.

BRIEF DESCRIPTION OF THE DRAWINGS

Figure 1:
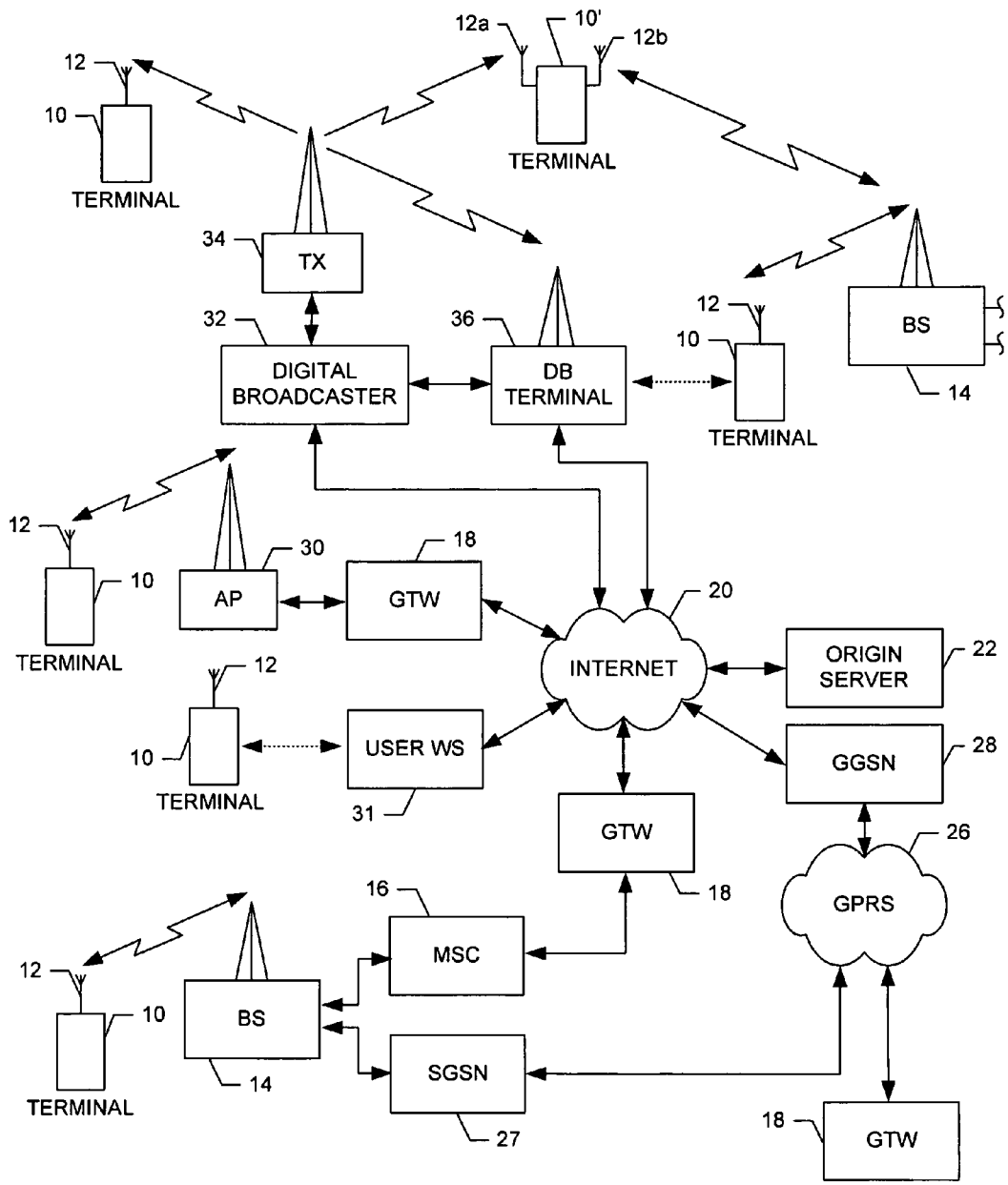
Figure 2:
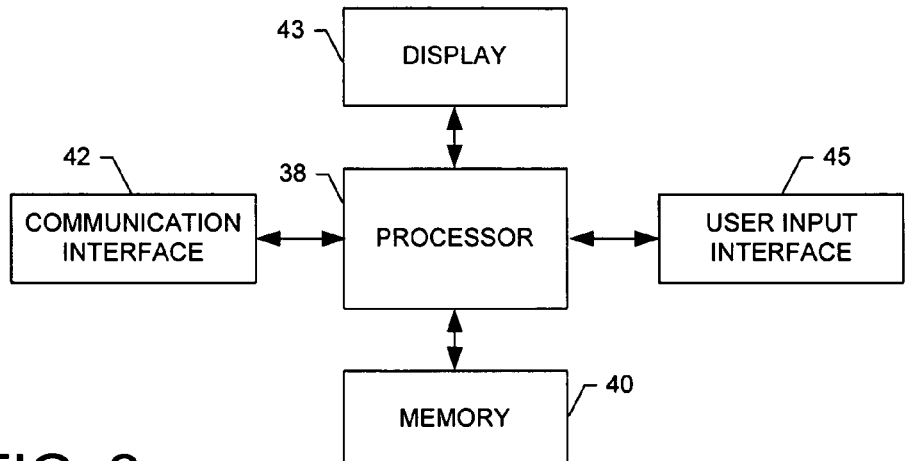
Figure 3:
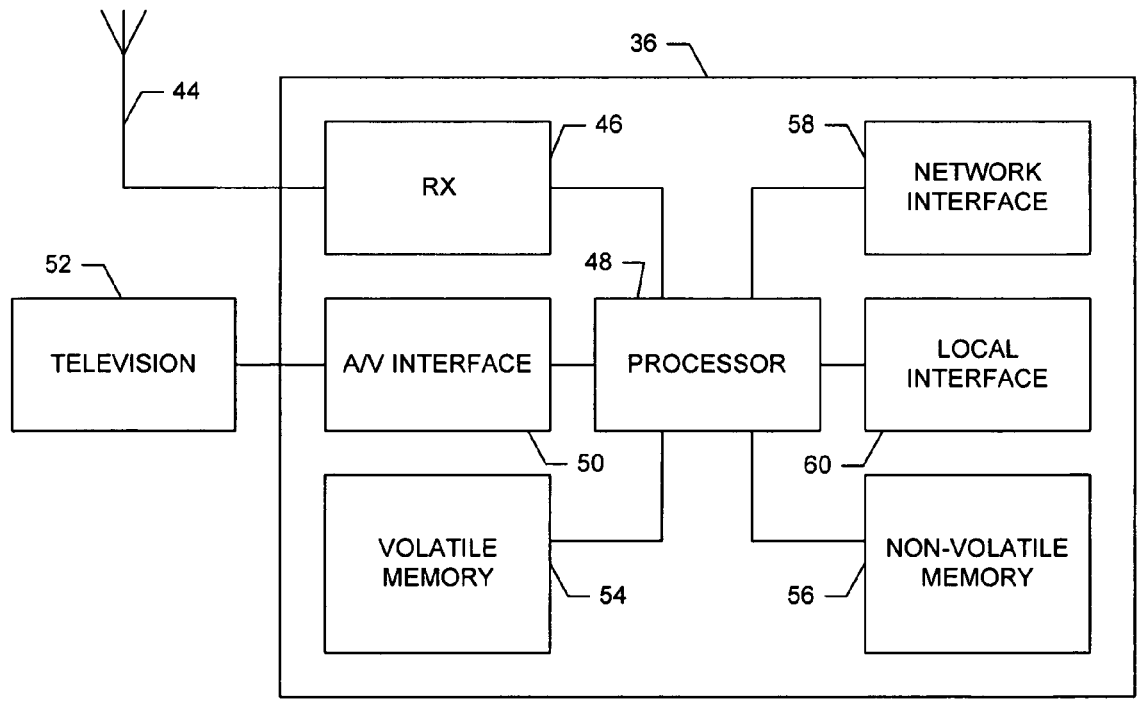
Figure 4:
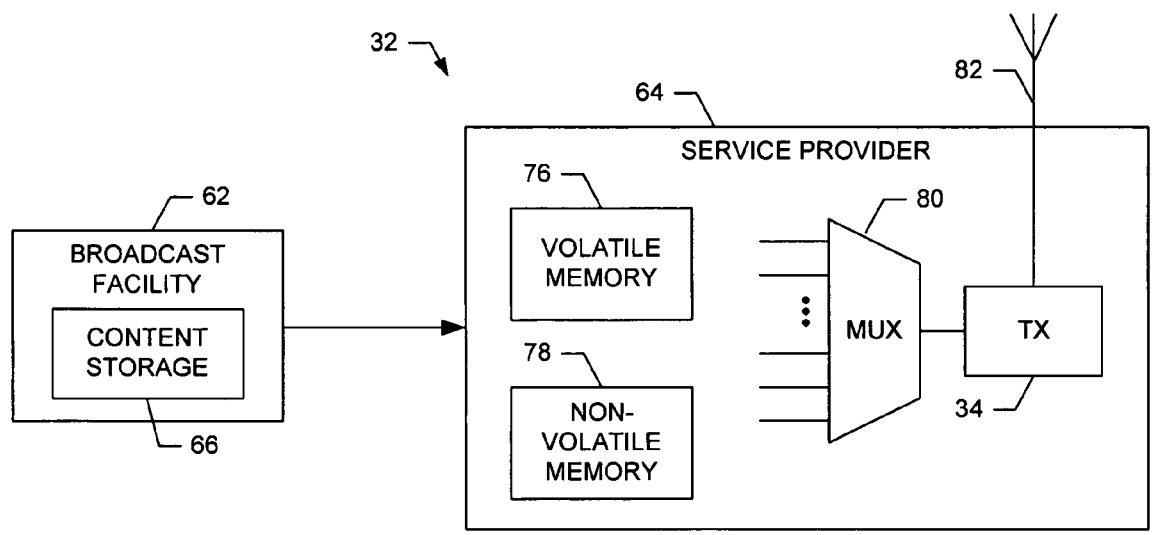
Figure 5:
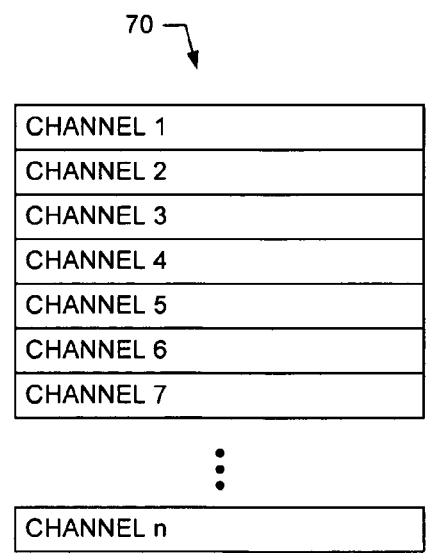
Figure 6:
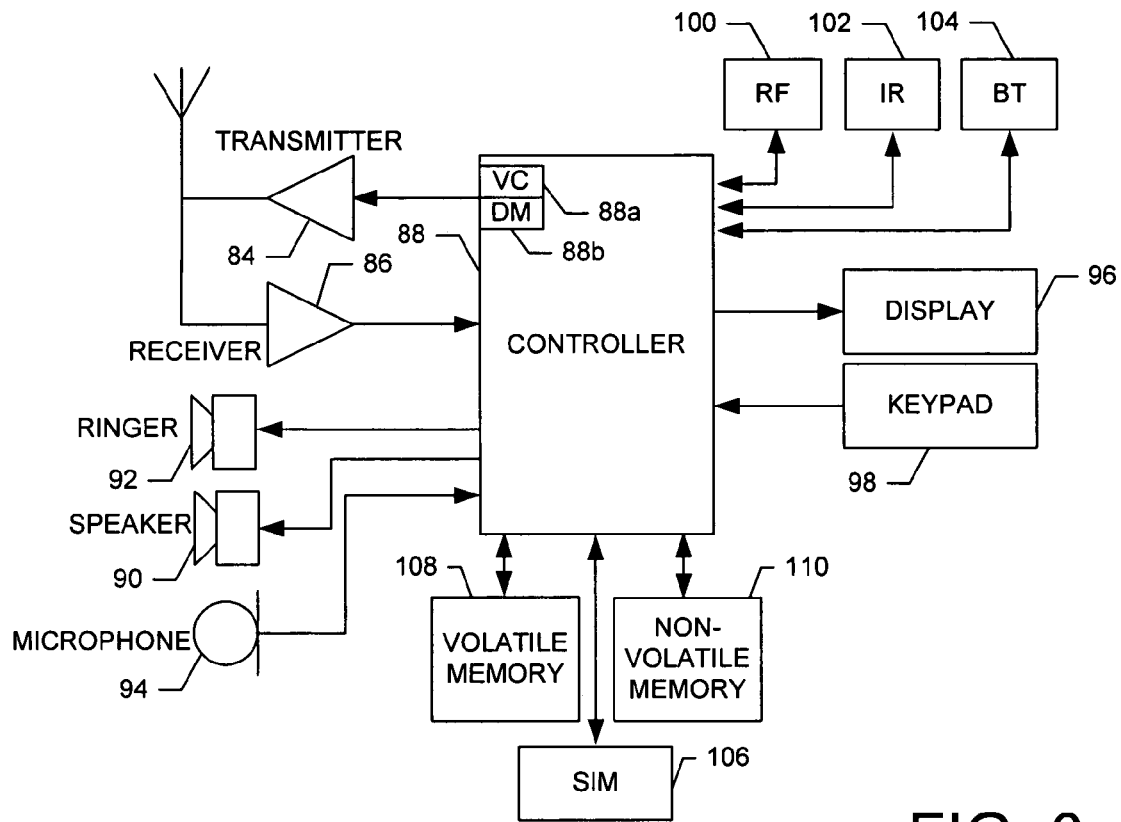
Figure 7:
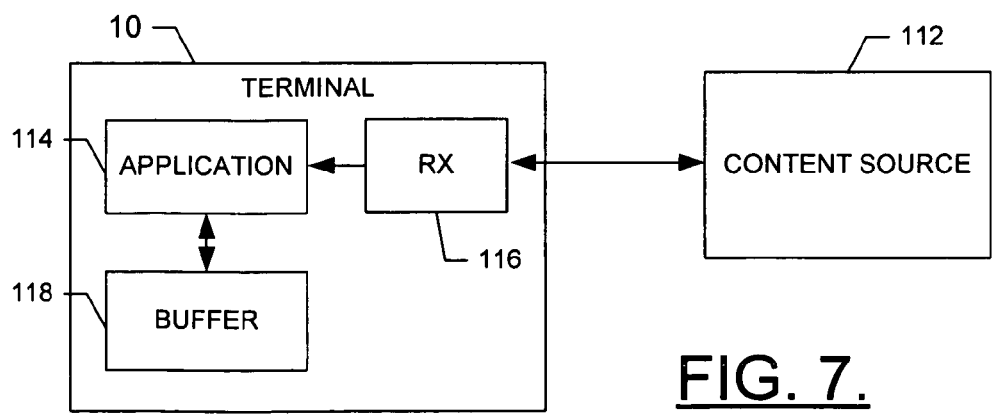
Figure 8A:
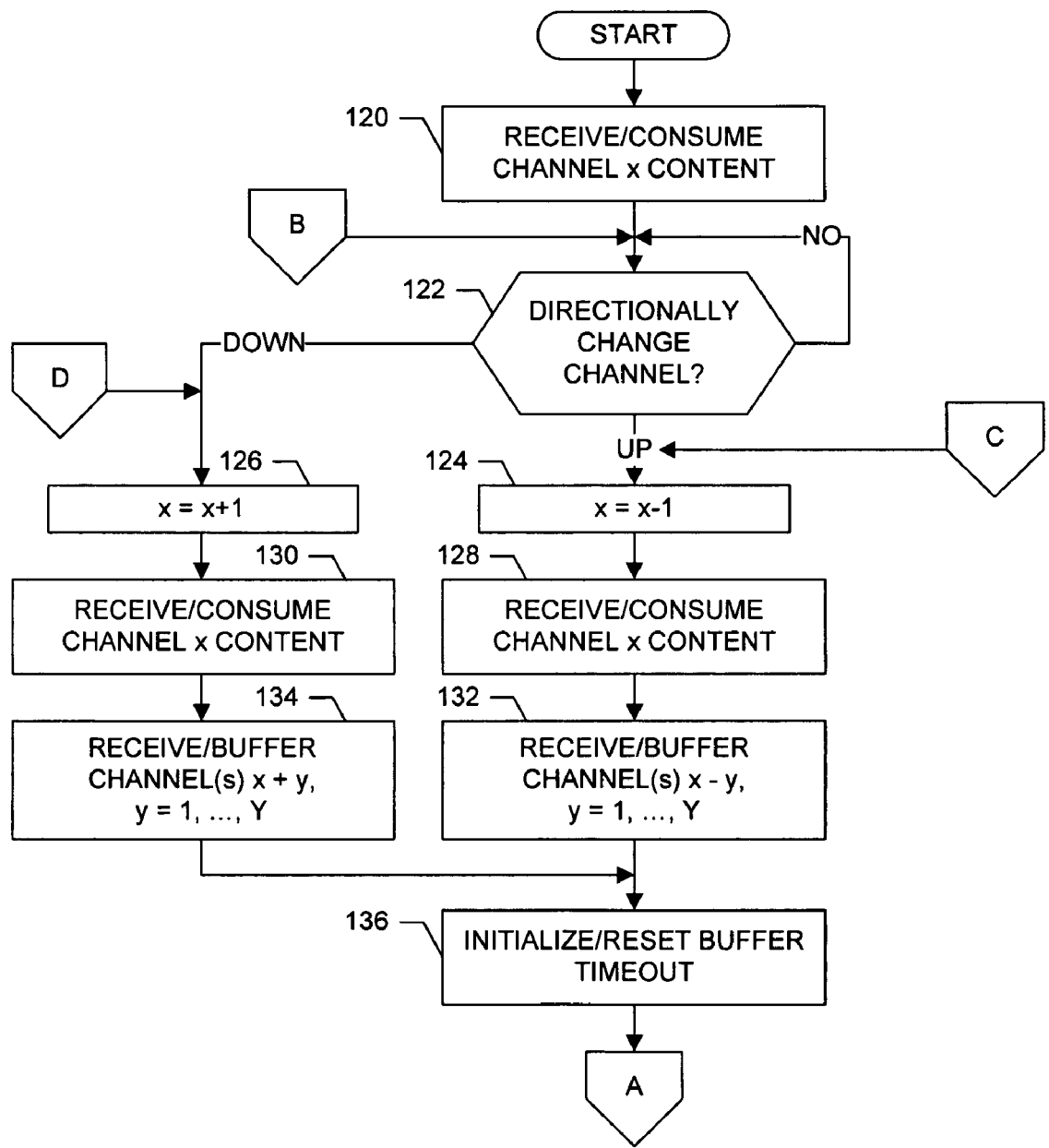
Figure 8B:
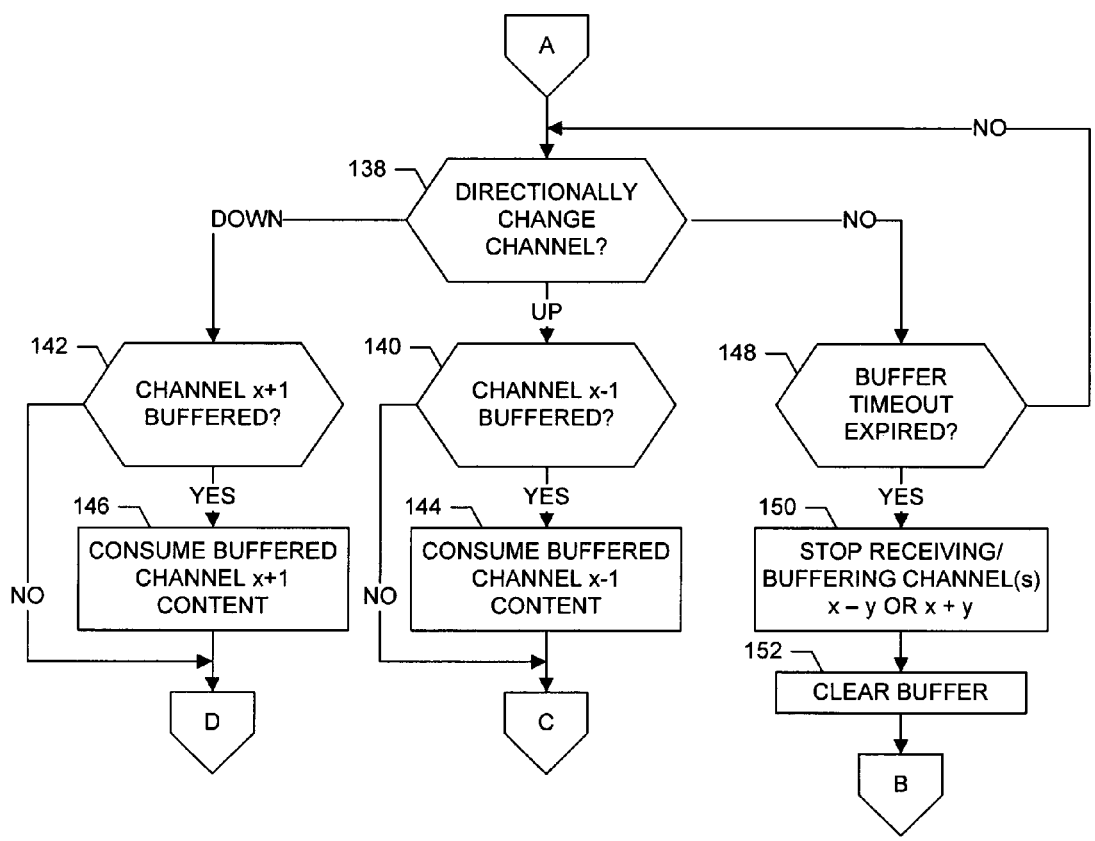
Figure 10A:
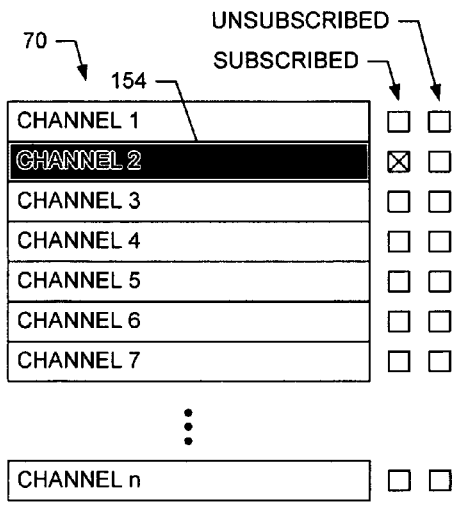
Figure 10B:
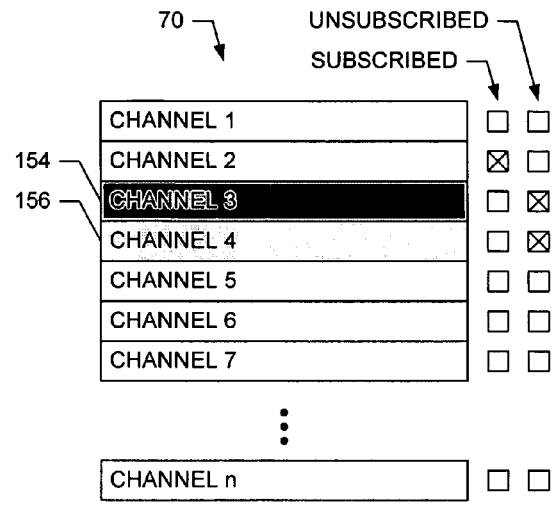
Figure 10C:
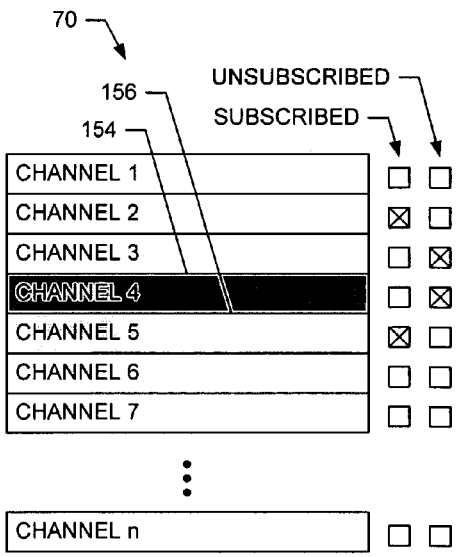
Figure 10D:
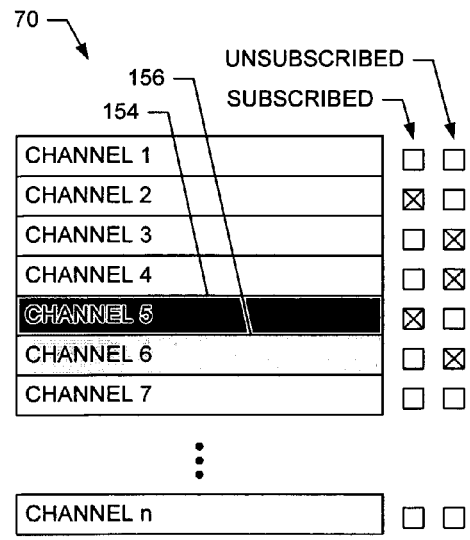
Figure 10E:
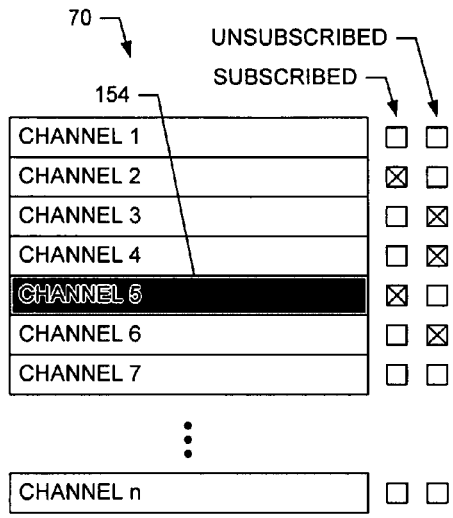
Figure 10F:
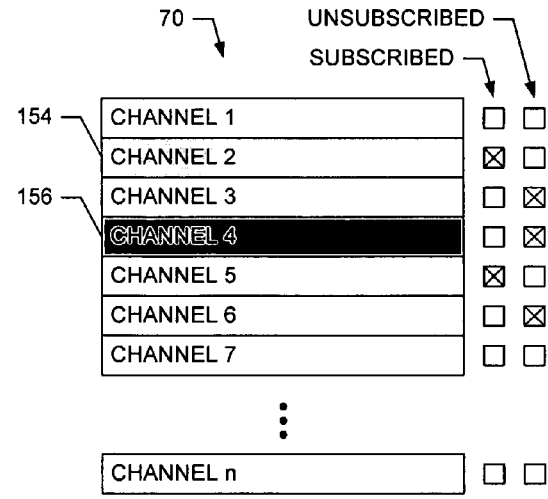
Figure 10G:
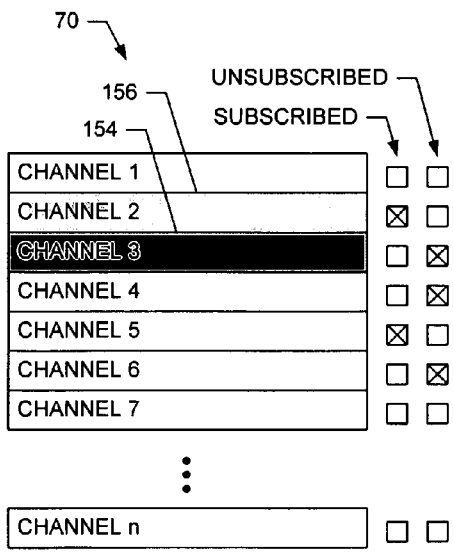
Figure 10H:
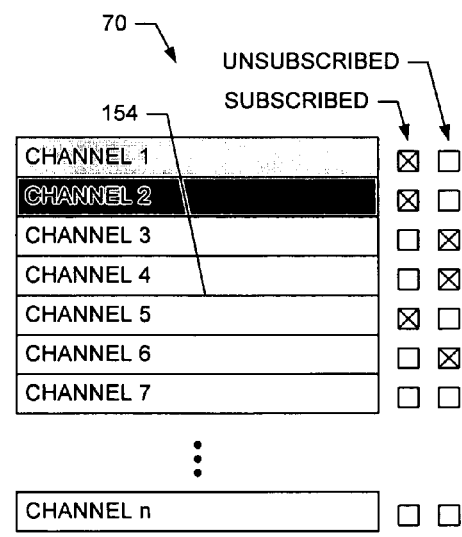
Figure 11A:
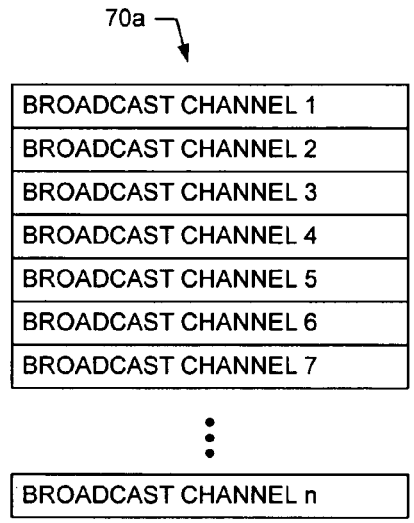
Figures 11B, 11C:
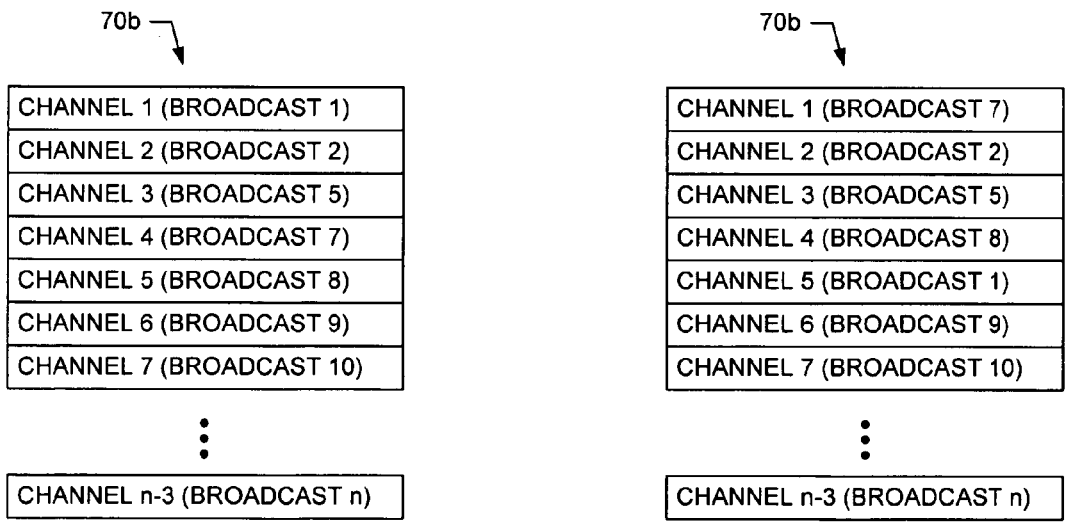

Having thus described the invention in general terms, reference will now be made to the accompanying drawings, which are not necessarily drawn to scale, and wherein:

FIG. 1 is a schematic block diagram of a wireless communications system according to one exemplary embodiment of the present invention including a cellular network and a data network to which a terminal is bi-directionally coupled through wireless RF links;

FIG. 2 is a schematic block diagram of an entity capable of operating as a terminal, origin server, digital broadcast receiving terminal and/or a digital broadcaster, in accordance with exemplary embodiments of the present invention;

FIG. 3 is a functional block diagram of a digital broadcast receiving terminal, in accordance with one exemplary embodiment of the present invention;

FIG. 4 is a functional block diagram of the digital broadcaster, in accordance with one exemplary embodiment of the present invention;

FIG. 5 is a schematic illustration of ordered channels of broadcast content, in accordance with one exemplary embodiment of the present invention;

FIG. 6 is a schematic block diagram of a mobile station that may operate as a terminal, according to exemplary embodiments of the present invention;

FIG. 7 is a functional block diagram of a terminal receiving broadcast content for one or more channels of a set of ordered channels, in accordance with exemplary embodiments of the present invention;

FIGS. 8a and 8b are flowcharts of various steps in a method of providing broadcast content, in accordance with exemplary embodiments of the present invention;

FIGS. 9a-9f are schematic illustrations of ordered channels of content during operation of a terminal in accordance with one exemplary embodiment of the present invention;

FIGS. 10a-10h are schematic illustrations of ordered channels of content during operation of a terminal accounting for channel subscriptions in buffering channels, in accordance with another exemplary embodiment of the present invention; and FIGS. 11a-11c are schematic illustrations of a set of ordered channels of broadcast content, where the set defined by a content source (FIG. 11a) is altered as to the channels included in the set (FIG. 11b), and the ordering of the channels included in the set (FIG. 11c).

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Referring to FIG. 1, an illustration of one type of terminal and system that would benefit from the present invention is provided. The system, method and computer program product of exemplary embodiments of the present invention will be primarily described in conjunction with mobile communications applications. It should be understood, however, that the system, method and computer program product of exemplary embodiments of the present invention can be utilized in conjunction with a variety of other applications, both in the mobile communications industries and outside of the mobile communications industries. For example, the system, method and computer program product of exemplary embodiments of the present invention can be utilized in conjunction with wireline and/or wireless network (e.g., Internet) applications.

As shown, a terminal 10 may include an antenna 12 for transmitting signals to and for receiving signals from a base site or base station (BS) 14. The base station is a part of a cellular network that includes elements required to operate the network, such as a mobile switching center (MSC) 16. As well known to those skilled in the art, the cellular network may also be referred to as a Base Station/MSC/Interworking function (BMI). In operation, the MSC is capable of routing calls and messages to and from the terminal when the terminal is making and receiving calls. The MSC also provides a connection to landline trunks when the terminal is involved in a call. Further, the MSC can be coupled to a server gateway (GTW) 18.

The MSC 16 can be coupled to a data network, such as a local area network (LAN), a metropolitan area network (MAN), and/or a wide area network (WAN). The MSC can be directly coupled to the data network. In one typical embodiment, however, the MSC is coupled to a GTW 18, and the GTW is coupled to a WAN, such as the Internet 20. In turn, devices such as processing elements (e.g., personal computers, server computers or the like) can be coupled to the terminal 10 via the Internet. For example, as explained below, the processing elements can include one or more processing elements associated with an origin server 22 or the like, one of which being illustrated in FIG. 1.

In addition to the MSC 16, the BS 14 can be coupled to a signaling GPRS (General Packet Radio Service) support node (SGSN) 24. As known to those skilled in the art, the SGSN is typically capable of performing functions similar to the MSC 16 for packet switched services. The SGSN, like the MSC, can be coupled to a data network, such as the Internet 20. The SGSN can be directly coupled to the data network. In a more typical embodiment, however, the SGSN is coupled to a packet-switched core network, such as a GPRS core network 26. The packet-switched core network is then coupled to another GTW, such as a GTW GPRS support node (GGSN) 28, and the GGSN is coupled to the Internet. In addition to the GGSN, the packet-switched core network can also be coupled to a GTW 18.

By coupling the SGSN 24 to the GPRS core network 26 and the GGSN 28, devices such as origin servers 22 can be coupled to the terminal 10 via the Internet 20, SGSN and GGSN. In this regard, devices such as origin servers can communicate with the terminal across the SGSN, GPRS and GGSN. For example, origin servers can provide content to the terminal, such as in accordance with the Multimedia Broadcast Multicast Service (MBMS). For more information on the MBMS, see Third Generation Partnership Project (3GPP) technical specification 3GPP TS 22.146, entitled: *Multimedia*

Broadcast Multicast Service (*MBMS*), the contents of which are hereby incorporated by reference in its entirety.

In addition to being coupled to the BS 14, the terminal 10 can be coupled to one or more wireless access points (APs) 30. The APs can comprise access points configured to communicate with the terminal in accordance techniques such as, for example, radio frequency (RF), Bluetooth (BT), infrared (IrDA) or any of a number of different wireless networking techniques, including WLAN techniques. Additionally, or alternatively, the terminal can be coupled to one or more user workstations (WS) 31. Each user workstation can comprise a computing system such as personal computers, laptop computers or the like. In this regard, the user workstations can be configured to communicate with the terminal in accordance with techniques such as, for example, RF, BT, IrDA or any of a number of different wireline or wireless communication techniques, including LAN and/or WLAN techniques. One or more of the user workstations can additionally, or alternatively, include a removable memory capable of storing content, which can thereafter be transferred to the terminal.

The APs 30 and the workstations 31 may be coupled to the Internet 20. Like with the MSC 16, the APs and workstations can be directly coupled to the Internet. In one advantageous embodiment, however, the APs are indirectly coupled to the Internet via a GTW 18. As will be appreciated, by directly or indirectly connecting the terminals and the origin server 22, as well as any of a number of other devices, to the Internet, the terminals can communicate with one another, the origin server, etc., to thereby carry out various functions of the terminal, such as to transmit data, content or the like to, and/or receive content, data or the like from, the origin server. As used herein, the terms "data," "content," "information" and similar terms may be used to interchangeably to refer to data capable of being transmitted, received and/or stored in accordance with exemplary embodiments of the present invention. Thus, use of any such terms should not be taken to limit the spirit and scope of the present invention.

Further, the terminal 10 can additionally, or alternatively, be coupled to a digital broadcaster 32 via a digital broadcast network, such as a terrestrial digital video broadcasting (e.g., DVB-T, DVB-H, ISDB-T, ATSC, etc.) network. As will be appreciated, by directly or indirectly connecting the terminals and the digital broadcaster, the terminals can receive content, such as content for one or more television, radio and/or data channels, from the digital broadcaster. In this regard, the digital broadcaster can include, or be coupled to, a transmitter (TX) 34, such as a DVB TX. Similarly, the terminal can include a receiver, such as a DVB receiver (not shown). The terminal can be capable of receiving content from any of a number of different entities in any one or more of a different number of manners. In one embodiment, for example, the terminal can comprise a terminal 10' capable of transmitting and/or receiving data, content or the like in accordance with a DVB (e.g., DVB-T, DVB-H, etc.) technique as well as a cellular (e.g., 1G, 2G, 2.5G, 3G, etc.) communication technique. In such an embodiment, the terminal 10' may include an antenna 12a for receiving content from the DVB TX, and another antenna 12b for transmitting signals to and for receiving signals from a BS 14. For more information on such a terminal, see U.S. patent application Ser. No. 09/894,532, entitled: Receiver, filed Jun. 29, 2001, the contents of which is incorporated herein by reference in its entirety.

In addition to, or in lieu of, directly coupling the terminal 10 to the digital broadcaster 32 via the TX 34, the terminal can be coupled to a digital broadcast (DB) receiving terminal 36 which, in turn, can be coupled to the digital broadcaster 32, such as directly and/or via the TX. In such instances, the digital broadcast receiving terminal can comprise a DVB receiver, such as a DVB receiver in the form of a set top box. The terminal can be locally coupled to the digital broadcast receiving terminal, such as via a personal area network. In one advantageous embodiment, however, the terminal can additionally or alternatively be indirectly coupled to the digital broadcast receiving terminal via the Internet 20.

Referring now to FIG. 2, a block diagram of an entity capable of operating as a terminal 10, origin server 22, digital broadcast receiving terminal 36, and/or a digital broadcaster 32 is shown in accordance with one embodiment of the present invention. Although shown as separate entities, in some embodiments, one or more entities may support one or more of a terminal, origin server, digital broadcast receiving terminal, and/or a digital broadcaster, logically separated but co-located within the entit(ies). For example, a single entity may support a logically separate, but co-located, terminal and digital broadcast receiving terminal. Also, for example, a single entity may support a logically separate, but co-located digital broadcast receiving terminal and digital broadcaster.

As shown, the entity capable of operating as a terminal 10, origin server 22, digital broadcast receiving terminal 36, and/or a digital broadcaster 32 can generally include a processor 38 connected to a memory 40. The memory can comprise volatile and/or non-volatile memory, and typically stores content, data or the like. For example, the memory typically stores content transmitted from, and/or received by, the entity. Also for example, the memory typically stores client applications, instructions or the like for the processor to perform steps associated with operation of the entity in accordance with exemplary embodiments of the present invention. As explained below, for example, the memory can store client application(s), such as a conventional text viewer, audio player, video player, multimedia viewer or the like, for consuming content for one or more television, radio and/or data channels.

Also, for example, the memory 40 can store a digital rights management (DRM) engine integral or otherwise in communication with one or more client application(s) such that the DRM engine can control the consumption of content based upon a DRM technique. Such a DRM engine may be configured in accordance with any of a number of different DRM techniques including, for example, that defined by the Open Mobile Alliance (OMA) Digital Rights Management specification. Further, the memory can store a decryption module integral or otherwise in communication with one or more client application(s) and the DRM engine such that the encryption/decryption module can encrypt content for consumption by the client application(s). In this regard, the decryption module can be configured to decrypt content in accordance with any of a number of different techniques by which the content is encrypted including, for example, Internet Protocol Security (IPSec), Secure Real Time Transport Protocol (SRTP) or the like.

As described herein, the client application(s), DRM engine and decryption module each comprise software operated by the respective entities. It should be understood, however, that any one or more of the client applications, DRM engine and decryption module described herein can alternatively comprise firmware or hardware, without departing from the spirit and scope of the present invention. Generally, then, the terminal 10, origin server 22, digital broadcast receiving terminal 36, and/or a digital broadcaster 32 can include one or more logic elements for performing various functions of one or more client application(s), DRM engine and/or decryption module. As will be appreciated, the logic elements can be embodied in any of a number of different manners. In this regard, the logic elements performing the functions of one or more client applications, DRM engine and/or decryption module can be embodied in an integrated circuit assembly including one or more integrated circuits integral or otherwise in communication with a respective network entity (i.e., terminal, origin server, digital broadcast receiving terminal, digital broadcaster, etc.) or more particularly, for example, a processor 38 of the respective network entity. The design of integrated circuits is by and large a highly automated process. In this regard, complex and powerful software tools are available for converting a logic level design into a semiconductor circuit design ready to be etched and formed on a semiconductor substrate. These software tools, such as those provided by Avant! Corporation of Fremont, Calif. and Cadence Design, of San Jose, Calif., automatically route conductors and locate components on a semiconductor chip using well established rules of design as well as huge libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

In addition to the memory 40, the processor 38 can also be connected to at least one interface or other means for displaying, transmitting and/or receiving data, content or the like. In this regard, the interface(s) can include at least one communication interface 42 or other means for transmitting and/or receiving data, content or the like, as well as at least one user interface that can include a display 43 and/or a user input interface 45. The user input interface, in turn, can comprise any of a number of devices allowing the entity to receive data from a user, such as a keypad, a touch display, a joystick or other input device. As more particularly explained below, for example, the user input interface can include one or more directional keys (hard and/or soft keys) for directionally selecting ordered items, such as ordered channels of content.

Reference is now made to FIG. 3, which illustrates a functional block diagram of a digital broadcast receiving terminal 36, in accordance with one embodiment of the present invention. As shown, the digital broadcast receiving terminal includes an antenna 44 for receiving signals from a digital broadcaster 32 and feeding the signals into a receiver (RX) 46. In turn, the receiver is capable of decrypting, demodulating and/or demultiplexing the signals, such as to extract content data. The receiver can feed the content data to a processor 48, which can thereafter decode the content data. The processor can then feed the decoded signal into an audio/video (A/V) interface 50, which can convert signals to a form suitable for display by a monitor, such as a television set 52.

The digital broadcast receiving terminal 36 can include volatile memory 54, such as volatile Random Access Memory (RAM) including a cache area for the temporary storage of data. The digital broadcast receiving terminal can also include non-volatile memory 56, which can be embedded and/or may be removable. The non-volatile memory can additionally or alternatively comprise an EEPROM, flash memory, hard disk or the like. The memories can store any of a number of pieces of information, content and data, used by the digital broadcast receiving terminal to implement the functions of the digital broadcast receiving terminal. For example, as indicated above, the memories can store content, such as that received from a digital broadcaster 32.

The digital broadcast receiving terminal 36 can also include one or more interface means for sharing and/or obtaining data from electronic devices, such as terminals 10 and/or digital broadcasters 32. More particularly, the digital broadcast receiving terminal can include a network interface means 58, for sharing and/or obtaining data from a network, such as the Internet 20. For example, the digital broadcast receiving terminal can include an Ethernet Personal Computer Memory Card International Association (PCMCIA) card configured to transmit and/or receive data to and from a network, such as the Internet.

The digital broadcast receiving terminal 36 can also include one or more local interface means 60 for locally sharing and/or obtaining data from electronic devices, such as a terminal. For example, the digital broadcast receiving terminal can include a radio frequency transceiver and/or an infrared (IR) transceiver so that data can be shared with and/or obtained in accordance with radio frequency and/or infrared transfer techniques. Additionally, or alternatively, for example, the digital broadcast receiving terminal can include a Bluetooth (BT) transceiver 52 operating using Bluetooth brand wireless technology developed by the Bluetooth Special Interest Group such that the digital broadcast receiving terminal can share and/or obtain data in accordance with Bluetooth transfer techniques. Further, the digital broadcast receiving terminal can additionally or alternatively be capable of sharing and/or obtaining data in accordance with any of a number of different wireline and/or wireless networking techniques, including LAN and/or WLAN techniques.

Reference is now made to FIG. 4, which illustrates a functional block diagram of the digital broadcaster 32 of one embodiment of the present invention. As shown, the digital broadcaster can include one or more broadcast facilities 62 capable of providing content to a digital broadcast service provider 64 for broadcast. Each broadcast facility can include volatile memory, such as volatile Random Access Memory (RAM) including a cache area for the temporary storage of data. The digital broadcaster can also include non-volatile memory, which can be embedded and/or may be removable. The non-volatile memory can additionally or alternatively comprise an EEPROM, flash memory, hard disk or the like. The memories can include, for example a content storage 66 for storing broadcast content, such as one or more channels of commercial and/or non-commercial broadcast television and/or radio content. In addition to including piece(s) of content stored in content storage, however, it should be understood that the broadcast facilities may also provide one or more channels of live broadcast content, such as news, sporting events or the like, which are incapable of being pre-stored in the content storage for any appreciable amount of time. Further, for example, the broadcast facilities may provide channels including pre-stored and live broadcast content, such as broadcast news content that can include one or more pre-stored news stories as well as live news anchor narratives for the news stories. Irrespective of whether the content is pre-stored or live, however, the digital broadcaster of one exemplary embodiment may broadcast such content over n ordered channels, as shown in the channel listing 70 of FIG. 5.

Like the digital broadcast receiving terminal 36, the digital broadcast service provider 64 of the digital broadcaster 32 can include volatile memory 76, such as volatile Random Access Memory (RAM) including a cache area for the temporary storage of data. The digital broadcaster can also include non-volatile memory 78, which can be embedded and/or may be removable. The non-volatile memory can additionally or alternatively comprise an EEPROM, flash memory, hard disk or the like. The memories can store any of a number of pieces of information, content and data, used by the digital broadcaster to implement the functions of the digital broadcaster. For example, as indicated above, the memories can store content, such as content for a television channel and other content for a number of other television, radio and/or data channels, as such can be provided by the broadcast facilities 62.

The digital broadcast service provider 64 of the digital broadcaster 32 can also include a multiplexer 80, which can be capable of multiplexing content for a number of television, radio and/or data channels, such as those provided by the broadcast facilities 62. In this regard, the multiplexer can be capable of multiplexing content for broadcast in accordance with a schedule 70 stored in schedule storage 66*a* of a broadcast facility 64. The multiplexer can then feed the resulting signal into a TX 34, which can be separate from the digital broadcaster, or more particularly the digital broadcast service provider, as shown in FIG. 1, or incorporated within the digital broadcaster, as shown in FIG. 4.

Irrespective of where the TX 34 is located relative to the digital broadcaster 32, the TX can receive the signal from the multiplexer 80 for encryption, modulation, amplification and/or transmission, such as via an antenna 82. For example, the digital broadcaster can be capable of directly or indirectly transmitting content to a digital broadcast receiving terminal 36 and/or a terminal 10, such as in accordance with a digital broadcasting technique, such as DVB-T. In this regard, the digital broadcaster can be capable of transmitting broadcast content, including one or more pieces of broadcast content stored by the content storage 66*a* of the broadcast facility 64, and/or one or more pieces of live broadcast content, in accordance with the times specified for the respective pieces of content in a schedule 70 stored by the schedule storage 66*b*. For information on DVB-T, see European Telecommunications Standards Institute (ETSI) Standard EN 300 744, entitled: *Digital Video Broadcasting (DVB): Framing structure, channel coding and modulation for digital terrestrial television*, v.1.1.2 (1997) and related specifications, the contents of which are hereby incorporated by reference in their entirety.

In accordance with a number of digital broadcasting techniques, such as DVB-T, Internet Protocol (IP) Datacast (IPDC) can be utilized to provide audio, video and/or other content to terminals 10. In this regard, the digital broadcaster 32 can be capable of providing IP datacasting content to the terminal utilizing a digital broadcasting technique. As will be appreciated by those skilled in the art, digital broadcasting techniques such as DVB-T are essentially cellular in nature with a transmission site associated with each of a number of different cells. DVB-T, for example, uses MPEG-2 transport streams, and as such, IP data can be encapsulated into DVB transmission signals sent from the digital broadcaster, or more particularly the TX 34. Data streams including IP datagrams can be supplied from several sources, and can be encapsulated by an IP encapsulator (not shown). The IP encapsulator, in turn, can feed the encapsulated IP data streams into the digital broadcasting (e.g., DVB-T) network.

The encapsulated IP data streams can then be transported to one or more transmission sites, where the transmission sites form cells of the data broadcasting network. For example, the encapsulated IP data streams can be transported to one or more transmission sites on an MPEG-2 transport stream for subsequent transmission over the air directly to the terminals, or to a receiver station serving one or more terminals. As will be appreciated, the MPEG-2 transport stream, from production by the IP encapsulator, to reception by the terminals or the receiver station, is typically uni-directional in nature. In this regard, IP packets containing the data can be embedded in multi-protocol encapsulation (MPE) sections that are transported within transport stream packets.

In addition to the IP packets, the MPE sections can also include forward error correction (FEC) information and time slicing information. By including information such as time slicing information, data can be conveyed discontinuously with the receiver (e.g., terminal 10), being capable of saving battery power by switching off when no data is being transmitted to the receiver. In other terms, in accordance with one time slicing technique, instead of using the current default method of continuous digital broadcasting (e.g., DVB-T) transmission, a time division multiplex-type of allocation technique can be employed (see, e.g., DVB-H standard). With such an approach, then, services can be provided in bursts, allowing a receiver to power down when the receiver is not receiving data, and allowing the receiver to power up to receive data packets, as necessary.

FIG. 6 illustrates a functional diagram of a mobile station that may operate as a terminal 10, according to exemplary embodiments of the invention. It should be understood, that the mobile station illustrated and hereinafter described is merely illustrative of one type of terminal that would benefit from the present invention and, therefore, should not be taken to limit the scope of the present invention. While several embodiments of the mobile station are illustrated and will be hereinafter described for purposes of example, other types of mobile stations, such as portable digital assistants (PDAs), pagers, laptop computers and other types of voice and text communications systems, can readily employ the present invention.

The mobile station includes a transmitter 84, a receiver 86, and a controller 88 that provides signals to and receives signals from the transmitter and receiver, respectively. These signals include signaling information in accordance with the air interface standard of the applicable cellular system, and also user speech and/or user generated data. In this regard, the mobile station can be capable of operating with one or more air interface standards, communication protocols, modulation types, and access types. More particularly, the mobile station can be capable of operating in accordance with any of a number of first-generation (1G), second-generation (2G), 2.5G and/or third-generation (3G) communication protocols or the like. For example, the mobile station may be capable of operating in accordance with 2G wireless communication protocols IS-136 (TDMA), GSM, IS-95 (CDMA) or the like. Also, for example, the mobile station may be capable of operating in accordance with 2.5G wireless communication protocols GPRS, Enhanced Data GSM Environment (EDGE), or the like. The mobile station can additionally or alternatively be capable of operating in accordance with any of a number of different digital broadcasting techniques, such as the DVB technique (e.g., DVB-T, ETSI Standard EN 300 744). The mobile station can also be capable of operating in accordance with any of a number of different broadcast and/or multicast techniques, such as the MBMS technique (e.g., 3GPP TS 22.146). Further, the mobile station can be capable of operating in accordance with ISDB-T, DAB, ATSC techniques or the like. Some narrow-band AMPS (NAMPS), as well as TACS, mobile stations may also benefit from embodiments of the present invention, as should dual or higher mode mobile stations (e.g., digital/analog or TDMA/CDMA/analog phones).

It is understood that the controller 88 includes the circuitry required for implementing the audio and logic functions of the mobile station. For example, the controller may be comprised of a digital signal processor device, a microprocessor device, and various analog to digital converters, digital to analog converters, and other support circuits. The control and signal processing functions of the mobile station are allocated between these devices according to their respective capabilities. The controller thus also includes the functionality to convolutionally encode and interleave message and data prior to modulation and transmission. The controller can additionally include an internal voice coder (VC) 88a, and may include an internal data modem (DM) 88b. Further, the controller may include the functionally to operate one or more software applications, which may be stored in memory.

The mobile station also comprises a user interface including a conventional earphone or speaker 90, a ringer 92, a microphone 94, a display 96, and a user input interface, all of which are coupled to the controller 88. The user input interface, which allows the mobile station to receive data, can comprise any of a number of devices allowing the mobile station to receive data, such as a keypad 98, a touch display (not shown) or other input device. In embodiments including a keypad, the keypad includes the conventional numeric (0-9) and related keys (#, *), and other keys used for operating the mobile station. For example, the keypad can additionally or alternatively include directional keys (↑, ↓) for directionally selecting ordered items, such as ordered channels of content.

The mobile station can also include one or more means for sharing and/or obtaining data from electronic devices, such as another terminal 10, an origin server 22, an AP 30, a digital broadcast receiving terminal 36, a digital broadcaster 32 or the like, in accordance with any of a number of different wireline and/or wireless techniques. For example, the mobile station can include a radio frequency (RF) transceiver 100 and/or an infrared (IR) transceiver 102 such that the mobile station can share and/or obtain data in accordance with radio frequency and/or infrared techniques. Also, for example, the mobile station can include a Bluetooth (BT) transceiver 104 such that the mobile station can share and/or obtain data in accordance with Bluetooth transfer techniques. Although not shown, the mobile station may additionally or alternatively be capable of transmitting and/or receiving data from electronic devices according to a number of different wireline and/or wireless networking techniques, including LAN and/or WLAN techniques. In this regard, as shown in FIG. 1 with respect to terminal 10', the mobile station may include an additional antenna or the like to transmit and/or receive data from such electronic devices (e.g., digital broadcaster).

The mobile station can further include memory, such as a subscriber identity module (SIM) 106, a removable user identity module (R-UIM) or the like, which typically stores information elements related to a mobile subscriber. In addition to the SIM, the mobile station can include other memory. In this regard, like the digital broadcast receiving terminal 36 and the digital broadcaster 32, the mobile station can include volatile memory 108. Also, again like the digital broadcast receiving terminal and the digital broadcaster, the mobile station can include other non-volatile memory 110, which can be embedded and/or may be removable. For example, the other non-volatile memory can comprise embedded or removable multimedia memory cards (MMC's), Memory Sticks manufactured by Sony Corporation, EEPROM, flash memory, hard disk or the like.

The memories 106, 108, 110 can store any of a number of pieces of information, and data, used by the mobile station to implement the functions of the mobile station. For example, the memories can store an identifier, such as an international mobile equipment identification (IMEI) code, capable of uniquely identifying the mobile station, such as to the MSC 16. The memories can also store one or more client applications, such as a conventional text viewer, audio player, video player, multimedia viewer or the like, for consuming content for one or more television, radio and/or data channels. As indicated above, although the client application(s) may comprise software operated by the respective entities, one or more such applications may alternatively comprise firmware or hardware.

As indicated in the background section, when a digital broadcaster broadcasts television, radio and/or data content over n ordered channels, as shown in the channel listing 70 of FIG. 5, an end user (e.g., terminal user) may desire to browse or otherwise channel hop through the available channels to select a desired channel to receive and consume (e.g., display, play, etc.). However, because channels may be broadcast in bursts that include time-sliced content for those channels, users moving from one channel to the next may experience a time delay (i.e., channel tuning time) dependent upon the burst interval as well as a number of other delays. Undesirably, such time delays can last up to ten seconds or more. And whereas techniques for buffering content for channels on either side of the currently selected channel reduce the time delay, such techniques also reduce the power saving benefits of broadcasting channels in time-sliced bursts, and may not even be possible to fully achieve with current receiver performance.

To decrease the delay associated with channel hopping without incurring the reduction in power saving experienced in buffering channels on either side of a selected channel, the terminal 10 of exemplary embodiments of the present invention is capable of providing controlled buffering of channels of content during channel hopping. Generally, controlled buffering of channels is based upon the premise that end users typically channel hop infrequently. And when end users do channel hop, they typically do so via directional keys (hard and/or soft keys) (e.g., keypad keys (↑, ↓)), as opposed to via a channel guide or other means (e.g., conventional numeric keys (0-9)) for directly selecting channels by number. In this regard, when users channel hop, they also typically do so in one direction or another (increasing or decreasing in channel order).

Based upon the preceding premises, then, the terminal 10 of exemplary embodiments of the present invention includes a buffer memory that typically remains empty while the terminal receives and consumes content for a selected channel, where the selected channel is one of a plurality of ordered channels. Then, when the terminal user selects a channel adjacent the selected channel, thereby initiating a channel hopping sequence, the terminal begins to buffer content for one or more next adjacent channels in the same direction from the selected channel. Exemplary embodiments of the present invention are therefore capable of at least partially buffering channels of content during channel hopping, without requiring the terminal 10 to continuously buffer channels on either side of a selected channel.

If the terminal user continues to channel hop in the same direction by selecting a buffered channel, that channel can be initially pulled from the buffer memory, thereby avoiding the delay associated with first receiving content for that channel from the next content burst. The terminal 10 can continue to buffer next adjacent channel(s) as the terminal user channel hops, but otherwise clears the buffer if a timeout period passes without the terminal user selecting a next channel. Thus, by clearing the buffer and operating without it while the terminal is receiving and consuming content for a channel for more than a timeout period, exemplary embodiments of the present invention are capable of achieving the full benefits of power saving resulting from delivering content in time-sliced bursts.

Reference is now drawn to FIGS. 7, 8a and 8b, which illustrate a functional block diagram and flowchart, respectively, of a terminal 10 and method of providing broadcast content to the terminal, in accordance with one embodiment of the present invention. More particularly, FIG. 7 illustrates a functional block diagram of a terminal receiving, from a content source 112, broadcast content for one or more channels of a set of ordered channels. Whereas the content source described below comprises a digital broadcaster 32, it should be understood that the content source can comprise any of a number of different sources (e.g., origin server 22, digital broadcast receiving terminal 36, etc.) capable of broadcasting content in accordance with exemplary embodiments of the present invention. Also, as described below, the terminal described herein with respect to the embodiment of FIGS. 7, 8a and 8b typically comprises terminal 10. It should be understood, however, that the terminal can equally comprise a digital broadcast receiving terminal, without departing from the spirit and scope of the present invention. Further, although the broadcast content may be described as being that for one or more television and/or radio channels. It should be understood that the broadcast content can comprise any of a number of different types of content, and can be received at the terminal 10 in accordance with any of a number of different wireline and/or wireless transfer techniques.

As shown in FIG. 7, the terminal 10 can operate a client application 114, such as a mobile TV application, for receiving and consuming (e.g., playing) content for a selected channel x of a plurality of ordered channels. After executing or otherwise activating the client application, a terminal user can direct the client application to receive and consume content for a selected channel, as shown in block 120 of FIG. 8a. For example, the client application can be configured to present a user interface (UI) including a channel listing 70 from which the user can select a desired channel. Irrespective of how the client application is directed to receive and consume content for a selected channel x, the application thereafter receives the selected channel content from a content source 112 via a receiver (RX) 116 of the terminal. The receiver can receive the selected channel content from the content source in accordance with any of a number of different transfer techniques such as, for example, techniques specified by DVB, GPRS, EDGE or the like. And the selected channel content can comprise content stored by the content storage 66 maintained by a broadcast facility 62 providing such content to the digital broadcaster 32.

As the client application 114 receives and consumes content for the selected channel x, the terminal user may decide to directionally browse the content of other channels. More particularly, the terminal user may decide to at least temporarily receive content for a channel up (−) or down (+) from the selected channel x in the ordered set of channels. For example, the terminal user may decide to change the channel to channel x−1 (up from the selected channel) or channel x+1 (down from the selected channel), such as by depressing an appropriate directional key (↑, ↓), as shown in block 122 of FIG. 8a. In such instances, the adjacent channel x−1 or channel x+1 becomes the selected channel (i.e., x=x−1 or x=x+1), with channel x becoming the previously selected channel, as shown in blocks 124 and 126. The client application can then operate to receive and consume content for the newly selected channel x, as shown in blocks 128 and 130.

It should be understood, however, that the client application 114 receiving and consuming content for the newly selected channel presumes that the newly selected channel is available for the client application to receive and consume. In various instances, it may be the case that the previously selected channel is the only channel available to the terminal user, and thus the terminal 10 and client application. In such instances, the client application may receive an indication from the content source 112 that the newly selected channel is unavailable for receipt and consumption by the terminal. The client application can then respond in any of a number of different manners, such as by communicating the indication, and/or other content reflective of the newly selected channel being unavailable, to the terminal user via a user interface of the terminal (e.g., display 43, display 96, etc.).

Presuming a plurality of channels are available for receipt and consumption by the client application 114, however, in accordance with exemplary embodiments of the present invention, directing the client application 114 to change channels to an adjacent channel not only causes the client application to receive content for that channel, but also for one or more of the next adjacent channels based upon the direction of the channel change. While the client application consumes content for the selected channel, however, the client application stores the next adjacent channel(s) in buffer memory 118. More particularly, when the client application is directed to receive and consume content for a selected channel x up (−) from the previously selected channel, the client application also receives and buffers content for channel(s) x−y, where y=1, . . . , Y and represents each of Y (e.g., 1) next adjacent channels buffered, as shown in block 132. Conversely, when the client application is directed to receive and consume content for a selected channel x down (+) from the previously selected channel, the client application receives and buffers content for channel(s) x+y, as shown in block 134.

In addition to receiving and consuming content for the newly selected channel x, and receiving and buffering content for the next adjacent channel(s) x−y or x+y, the client application 114 also typically initializes a buffer timeout, as shown in block 136. The buffer timeout can comprise any of a number of different time periods, such as from thirty seconds to a minute or more. As explained below, the buffer timeout can be utilized by the client application to determine when the user has stopped channel hopping such that the client application can clear the buffer memory and cease to buffer content.

Irrespective of the length of the buffer timeout, during this period, the user may continue to channel hop by browsing channels adjacent the newly selected channel, as explained below. More particularly, during the timeout period, the terminal user may again decide to change the channel to channel x−1 (up from the selected channel) or channel x+1 (down from the selected channel), such as by again depressing an appropriate directional key (↑, ↓), as shown in block 138 of FIG. 8b. In such instances, when the terminal user changes the channel in the same direction as before, content for the newly selected channel is buffered in memory. That is, if the terminal user previously changed the channel from channel x to channel x−1 (channel x−1 now the selected channel x), and then changes the channel in the same direction to channel x−1, content for that newly selected channel is buffered in memory 118. Similarly, if the terminal user previously changed the channel from channel x to channel x+1 (channel x+1 now the selected channel x), and then changes the channel in the same direction to channel x+1, content for that newly selected channel is buffered in memory.

If content for the newly selected channel x−1 or x+1 is buffered in memory 118, the client application 114 consumes the buffered content for the newly selected channel before the client application receives content for that channel from the content source 112, as shown in blocks 140 and 144 for selecting channel x−1, and blocks 142 and 146 for selecting channel x+1. In this regard, by consuming content for the newly selected channel from buffer memory before the client application receives that channel's content from the content source, the client application can provide content with a reduction in, if not elimination of, delay otherwise associated with initially receiving content for a selected channel.

After consuming the buffered content, or if content for the newly selected channel x−1 or x+1 is not buffered in memory 118, the client application 114 proceeds, as before, to set the newly selected channel as the selected channel (i.e., x=x−1 or x=x+1), with channel x becoming the previously selected channel (see blocks 124 and 126). The client application can then, as before, operate to receive and consume content for the newly selected channel x (see blocks 128 and 130). It should be appreciated, however, that if the client application does not first consume content for the newly selected channel from buffer memory, the client application may experience a delay in receiving, and thus consuming, content for the newly selected channel.

Also similar to before, while the client application receives and consumes content for the selected channel, the client application also receives and buffers content for channel(s) x−y or x+y (see blocks 132 and 134). In this regard, the client application receives and buffers content depending on the direction the terminal user changed the channel from the previously selected channel (i.e., depending on whether the terminal user changed the channel up (−) or down (+) from the previously selected channel). Further, the client application can reinitialize or otherwise reset the buffer timeout (see block 136).

The terminal user can continue to channel hop in the manner explained above, such as until the terminal user decides to remain tuned to, and thus receive and consume content for, a desired selected channel x. In such instances, the buffer timeout expires without being reinitialized or reset, as shown in block 140. Upon expiration of the buffer timeout, the client application 114 can respond in any of a number of different manners. For example, the client application can stop or otherwise cease buffering content for channel(s) x−y or x+y, as shown in block 148. Additionally, the client application can clear, or otherwise delete the content stored in, the buffer memory 118, as shown in block 152. The client application can then continue, as before, receiving and consuming content for the desired selected channel x, and waiting for the user to again select to change the channel (see block 122).

Figures 9D, 9E:
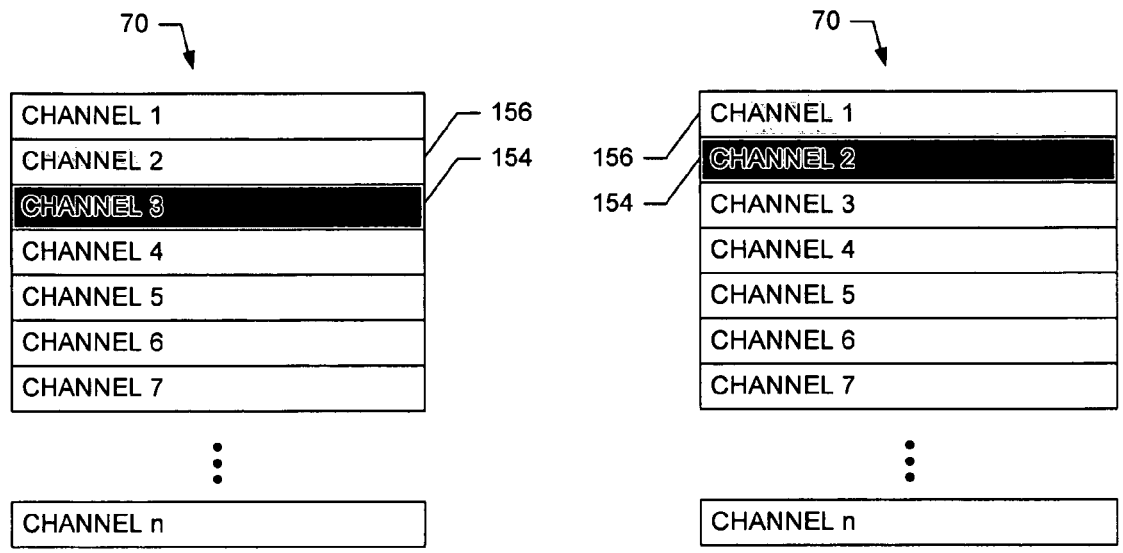

To further illustrate the benefits of exemplary embodiments of the present invention, consider the exemplary channel listings 70 of FIGS. 9a-9f. In this regard, as illustrated in FIG. 9a, the client application 114 is receiving and consuming (i.e., playing) content for channel 2, where channel 2 is the selected channel 154. As the client application receives/consumes content for channel 2 (i.e., channel x), the terminal user decides to channel hop around the channel listing to see what content is available on the other channels. Thus, the user changes the channel down (+) from channel 2 to adjacent channel 3 (i.e., channel x+1) by depressing a directional key ↓ of the terminal 10. Channel 3 then becomes the selected channel 154, and channel 2 becomes the previously selected channel.

In response to the terminal user changing the channel to channel 3, the client application 114 begins to receive and consume content for channel 3. In addition, the client application also begins to receive content for the next adjacent channel 156, namely channel 4 (i.e., x+y, y=1), as shown in FIG. 9b. Instead of consuming content for channel 4, however, the client application buffers the content for channel 4 to memory 118. Thus, presume the user again decides to change the channel down (+) from the selected channel 3 to adjacent channel 4, changing the channel in the same direction as before, as shown in FIG. 9c. As the client application is buffering content for channel 4, the client application can consume the buffered content until the client application can receive content for channel 4, such as during the next burst of time-sliced content. The client application can then transition into receiving and consuming content for channel 4 from the content source 112.

As also shown in FIG. 9c, as the client application 114 receives and consumes content for newly selected channel 4, the client application receives and buffers content for the next adjacent channel, i.e., channel 5. Thus, if the terminal user yet again decided to change the channel down (+) to channel 5, the client application could initially consume the buffered content for channel 5 before receiving and consuming content from the content source 112. On the other hand, consider that the user now decides to change the channel up (−) from the selected channel 4 to next adjacent channel 3 by depressing directional key ↑, changing the channel in the opposite direction as before, as shown in FIG. 9d. In this instance, the client application receives and consumes content for the newly selected channel 3 without first consuming content from the buffer memory 118. Accordingly, the client application may experience some delay in receiving the content for channel 3 from the content source.

Now, as the client application 114 receives and consumes content for newly selected channel 3, the client application receives and buffers content for the next adjacent channel, i.e., channel 2. As shown in FIG. 9e, then, presume the terminal user again decides to change the channel up (−) from the selected channel 3 to the next adjacent channel 2. As the client application is buffering content for channel 2, the client application can consume the buffered content until the client application can receive content for channel 2, thereby reducing any time delay otherwise associated with receiving content for channel 2. Then, as the client application receives and consumes content for newly selected channel 2, the client application also receives and buffers content for the next adjacent channel 1.

Figure 9F:
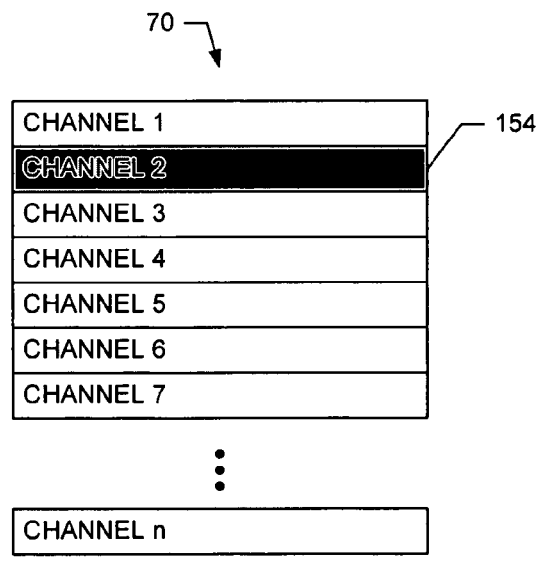

The terminal user can continue to channel hop the n channels of the channel listing 70, such as until the user decides to remain on a desired selected channel. As shown in FIG. 9f, for example, presume the user decides to remain on channel 2. Thus, after the buffer timeout expires, the client application 114 can cease to buffer content for the next adjacent channel 1 (see FIG. 9e). In addition, the client application can reset the buffer memory 118, thereby reducing memory consumption of the terminal 10.

As shown and described herein, during instances in which the terminal user channel hops to adjacent channels, the client application 114 buffers content for one or more next adjacent channels. It should be understood, however, that the client application may additionally or alternatively be configured to buffer channels of content in one or more other manners. For example, the client application may be configured to additionally or alternatively buffer content for the previously selected channel, irrespective of whether the newly selected channel is adjacent to the previously selected channel. Accordingly, the terminal user may toggle between the two channels, where the content for one of the channels is received and buffered while the content for the other channel is received and consumed.

Additionally or alternatively, the client application 114 may be configured of additionally or alternatively buffer content in accordance with channel usage statistics associated with the terminal user. For example, the client application can be configured to store a log of channels for which the terminal user directs the client application to receive and consume content. From such a log, the client application can compute various statistics regarding channel usage of the terminal user, such as to identify one or more channels for which the terminal user frequently directs the client application to receive and consume content, as compared to receiving and consuming content for one or more other channels. These channels, then, can be referred to as "preferred channels." Thus, during instances in which the channel user channel hops various channels (irrespective of the direction or location of the various channels), the client application can be configured to additionally or alternatively buffer content for one or more of the preferred channels. By buffering content for those preferred channels, exemplary embodiments of the present invention may be additionally or alternatively configured to buffer content for channels that may not be adjacent or next adjacent a selected channel.

In another additional or alternative configuration, the client application 114 may buffer channels based upon a channel subscription model whereby the terminal user subscribes to receive and consume content for one or more channels. In such an instance, the terminal user may subscribe to consume fewer than all of the channels in the set of channels available from the content source 112. Then, when the terminal user changes the channel to channel x−1 (up from the selected channel) or channel x+1 (down from the selected channel), the client application may receive an indication that the newly selected channel and/or the next adjacent channel(s) are unsubscribed channel(s) or are otherwise inaccessible. More particularly in accordance with techniques such as DVB-H, for example, content for a plurality of channels is encrypted, and then broadcast in time-sliced bursts. In addition to the encrypted content for the plurality of channels, each burst also includes a key stream with an encrypted key for decrypting content for each channel. When a terminal user subscribes to a given channel, then, the terminal 10 receives a rights object (RO) with which a DRM engine of the terminal can decrypt the key for the given channel. The decryption module can then decrypt the encrypted content for the given channel with the decrypted key such that the client application can consume the decrypted content. Thus, when the DRM engine fails to decrypt the key for a newly selected channel or next adjacent channel(s) in response to the terminal user changing channels, the client application may receive an indication from the DRM engine (or decryption module) that the newly selected channel and/or the next adjacent channel(s) are unsubscribed channels.

The client application 114 can respond to the indication in any of a number of different manners. For an unsubscribed selected channel, for example, the client application can inform the terminal user that the selected channel is unsubscribed, such as by displaying an indication that the selected channel is unsubscribed, and/or other content reflective of the selected channel being unsubscribed (e.g., blank screen, invitation to subscribe to channel, etc.), via a user interface of the terminal (e.g., display 43, display 96, etc.). Additionally or alternatively, for example, the client application can automatically select one or more next adjacent channels until the client application reaches a subscribed channel, where that channel can be indicated by receipt of subscribed content for that channel. That channel, then, becomes the newly selected channel. Further, for example, the client application can buffer content for the next adjacent subscribed channel(s) from the newly selected channel, bypassing any intervening unsubscribed broadcast channel(s).

More particularly, for example, consider the channel hopping sequences represented by the channel listings 70 of FIGS. 10a-10h. As shown in FIG. 10a, similar to the channel listing of FIG. 9a, presume the terminal user selects channel 2 such that the client application 114 is receives and consumes (i.e., plays) subscribed content for channel 2, with channel 2 being the selected channel 154. In this regard, the client application can receive a burst of encrypted content for a plurality of channels, as well as a key stream including encrypted keys for decrypting encrypted content for respective channels. Upon receiving content for channel 2, then, the terminal DRM engine can use a RO to decrypt the key for channel 2. The decryption module can then use the decrypted key to decrypt content for channel 2 such that the client application can thereafter consume the decrypted content. In addition, the first instance of selecting channel 2 (or first instance in a given time period, communication session, etc.) the client application can flag channel 2 as being a subscribed channel, such as in a subscription log (represented by the illustrated check boxes), where decryption of content for channel 2 indicates a subscription to that channel, for example. As shown and described herein, one or more channels are flagged as subscribed channels or unsubscribed channels during the first instance of selecting the respective channels. It should be understood, however, that the client application may be preconfigured with the channels appropriately flagged. In such instances, the client application can operate based upon the flag for the first instance of selecting a channel (and from that channel the next adjacent channel(s)), as described below for subsequent instances of selecting a channel (and from that channel the next adjacent channel(s)).

As the client application receives/consumes content for channel 2 (i.e., channel x), presume the terminal user decides to channel hop around the channel listing to see what content is available on the other channels. Thus, the user changes the channel down (+) from channel 2 to adjacent channel 3 (i.e., channel x+1) by depressing a directional key ↓ of the terminal 10. Channel 3 then becomes the selected channel 154, and channel 2 becomes the previously selected channel. In response to the terminal user changing the channel to channel 3, the client application 114 tunes to channel 3 and receives encrypted content for that channel. For purposes of illustration, consider that channel 3 is an unsubscribed channel for the terminal user. Although the client application receives content for channel 3, the terminal DRM engine may fail to decrypt the key for channel 3, and accordingly the decryption module may fail to decrypt the content for channel 3. Thus, instead of consuming content for channel 3, however, the client application receives an indication from the DRM engine (or decryption module) that channel 3 is an unsubscribed channel (i.e., DRM engine failed to decrypt the key, or the decryption module failed to decrypt the content, for channel 3). The client application can then consume the indication and/or other content reflective of the channel being unsubscribed (e.g., blank screen, invitation to subscribe, etc.), such as by displaying the indication and/or other reflective content via a user interface of the terminal (e.g., display 43, display 96, etc.). Similar to the first instance of selecting channel 2, the client application can flag channel 3 as being an unsubscribed channel, for example.

In addition to receiving content for channel 3, the client application 114 also receives decrypted content for the next adjacent channel 156, namely channel 4 (i.e., x+y, y=1), as shown in FIG. 10b. Presuming that channel 4 is also an unsubscribed channel, like channel 3, the client application receives an indication from the DRM engine (or decryption module) that channel 4 is an unsubscribed channel, and for the first instance of selecting channel 4, flags channel 4 as being an unsubscribed channel. Instead of consuming the indication for channel 4, however, the client application buffers the indication and/or other reflective content (i.e., content reflective of the channel being unsubscribed) for channel 4 to memory 118. Although not shown, if so desired, the client application can then automatically select the next adjacent channel 5, and receive and buffer decrypted content for channel 5 if channel 5 is a subscribed channel (the decryption module using a decrypted key—decrypted by the DRM engine—to decrypt the content). Otherwise, if channel 5 is likewise an unsubscribed channel, the client application can continue to select next adjacent channels in a like manner until reaching the next adjacent subscribed channel, receiving and buffering content for that subscribed channel.

Presume the user again decides to change the channel down (+) from the selected channel 3 to adjacent channel 4, changing the channel in the same direction as before, as shown in FIG. 10*c*. As the client application 114 is buffering the indication and/or other reflective content for channel 4, the client application can consume the buffered indication and/or other reflective content for channel 4, such as in the same manner as the client application consumed the buffered indication and/or other reflective content for channel 3. As also shown in FIG. 10*c*, as the client application consumes the indication and/or other reflective content for newly selected channel 4, the client application receives and buffers content for the next adjacent channel, i.e., channel 5. Presuming channel 5 is a subscribed channel, the client application receives encrypted content for channel 5, which the decryption module decrypts with a key, which the DRM engine decrypted with an appropriate RO. The client application can then buffer the decrypted content for channel 5, and for the first instance of selecting channel 5, flags channel 5 as being a subscribed channel. Thus, if the terminal user yet again decided to change the channel down (+) to channel 5, the client application could initially consume the buffered content for channel 5 before receiving and consuming content from the content source 112, and likewise receive and buffer content for the next adjacent channel 6, as shown in FIG. 10*d* (channel 6 being shown as an unsubscribed channel such that the buffered content comprises an indication and/or other reflective content).

The terminal user can continue to channel hop the n channels of the channel listing 70, such as until the user decides to remain on a desired selected channel. As shown in FIG. 10*e*, for example, presume the user decides to remain on channel 5. Thus, after the buffer timeout expires, the client application 114 can cease to buffer content for the next adjacent channel 6 (see FIG. 10*d*). In addition, the client application can reset the buffer memory 118, thereby reducing memory consumption of the terminal 10.

Sometime after expiration of the buffer timeout, presume that the user decides to change the channel up (−) from the selected channel 5 to next adjacent channel 4 by depressing directional key ↑, changing the channel in the opposite direction as before, as shown in FIG. 10*f*. In this instance, the client application can tune to newly selected channel 4, and since channel 4 is an unsubscribed channel, receive encrypted content for channel 4, and consume an indication from the DRM engine (or decryption module) and/or other content reflective of channel 4 being an unsubscribed channel. Alternatively, having flagged channel 4 as an unsubscribed channel, the client application may store the indication and/or other reflective content for channel 4 in memory of the terminal (e.g., memory 40, 110, etc.). In such instances, in lieu of waiting for the DRM engine (or decryption module) to indicate that channel 4 is an unsubscribed channel, the client application may consume the indication and/or other reflective content from memory.

Having flagged the immediately adjacent channel 3 as an unsubscribed channel and thereby recognizing channel 3 as such, the client application bypasses channel 3 to arrive at the next adjacent subscribed channel 2. Now, as the client application 114 consumes the indication and/or other reflective content for newly selected channel 4, instead of buffering content for the next adjacent, unsubscribed channel 3, the client application receives and buffers decrypted content for the next adjacent subscribed channel, i.e., channel 2, as also shown in FIG. 10*f* (the decryption module being capable of decrypting content for channel 2 using a key previously decrypted by the DRM engine with an appropriate RO). As shown in FIG. 10*g*, then, presume the terminal user again decides to change the channel up (−) from the selected channel 4 to the next adjacent channel 3. Similar to selecting unsubscribed channel 4, the client application receive and consume an indication from the DRM engine (or decryption module) and/or other content reflective of channel 3 being an unsubscribed channel, or alternatively consume the indication and/or other reflective content for channel 3 from memory (if stored therein). As the next adjacent subscribed channel remains channel 2, the client application can continue to receive and buffer decrypted content for channel 2 (the decryption module having decrypted the content). Then, should the terminal user decide to change the channel up (−) to channel 2, the client application can consume the buffered decrypted content until the client application can receive content for channel 2, thereby reducing any time delay otherwise associated with receiving content for channel 2.

In addition to or in lieu of the foregoing alternative configurations of the client application 114, the client application may, for example, be configured to receive a schedule at one or more instances, where the schedule includes one or more slots specifying broadcast times, including dates, for content broadcast for one or more channels over a period of time (e.g., year, month, week, day, etc.). In such instances or in a number of other instances, the client application can be configurable to receive selection of one or more channels of content scheduled for broadcast at one or more future broadcast times. Then, at one or more instances leading up to the respective broadcast time(s), the client application can present the terminal user with a reminder of the impending broadcast of content for the respective channel(s), such as via a user interface of the terminal (e.g., display 43, display 96, etc.). For one or more of those reminders, the client application can additionally present a selection for the terminal user to select to change the channel to a respective channel. The client application can then be configured to additionally or alternatively buffer content for the respective channel such that, if the terminal user selects to change the channel to the respective channel, the client application can consume the buffered content for the respective channel before receiving and consuming content for the respective channel from the content source 112.

As further shown and described herein, the set of channels and ordering of those channels is defined by the content source 112. It should be understood, however, that the terminal user can alter, via the client application 114, the set of channels and/or ordering of channels defined by the content source. In such instances, then, the set and ordering of channels utilized by the client application to identify the adjacent and next adjacent channel(s) typically (but not always) comprises the set and/or ordering as altered by the terminal user. The channel set and ordering described above, then, may more generally be user-defined in that the set and/or ordering defined by the content source is modified by the terminal user.

For example, presume that the content source 112 broadcasts a set of ordered channels as shown in the broadcast channel listing 70a FIG. 11a including n ordered channels. Also, presume that the terminal user desires to alter the broadcast channel listing to remove broadcast channels 3, 4 and 6. In such instances, the user-defined set of ordered channels from which the terminal user may select includes n−3 ordered channels, where user-defined channels 1, 2, 3, 4, 5, 6, 7, . . . , n−3 correspond to broadcast channels 1, 2, 5, 7, 8, 9, 10, . . . , n, as shown in the user-defined channel listing 70b of FIG. 11b. Now presume that the terminal user desires to further reorder the user-defined set of channels such that channel 7 is ordered before channel 2, and such that channel 1 is ordered after channel 8. Thus, the user-defined set still includes n−3 ordered channels, but those channels are now ordered such that user-defined channels 1, 2, 3, 4, 5, 6, 7, n−3 correspond to broadcast channels 7, 2, 5, 8, 1, 9, 10, . . . , n, as shown in the user-defined channel listing of FIG. 11c.

According to one aspect of the present invention, all or a portion of the system of the present invention, such all or portions of the terminal 10, digital broadcast receiving terminal 36, and/or a digital broadcaster 32, generally operates under control of a computer program product (e.g., client application 114, etc.). The computer program product for performing the methods of exemplary embodiments of the present invention includes a computer-readable storage medium, such as the non-volatile storage medium, and computer-readable program code portions, such as a series of computer instructions, embodied in the computer-readable storage medium.

In this regard, FIGS. 8a and 8b, are functional block diagrams and flowcharts, respectively, of methods, systems and program products according to the invention. It will be understood that each block or step of the functional block diagrams and flowcharts, and combinations of blocks in the functional block diagrams and flowcharts, can be implemented by computer program instructions. These computer program instructions may be loaded onto a computer or other programmable apparatus to produce a machine, such that the instructions which execute on the computer or other programmable apparatus create means for implementing the functions specified in the block(s) or step(s) of the functional block diagrams and flowcharts. These computer program instructions may also be stored in a computer-readable memory that can direct a computer or other programmable apparatus to function in a particular manner, such that the instructions stored in the computer-readable memory produce an article of manufacture including instruction means which implement the function specified in the block(s) or step(s) of the functional block diagrams and flowcharts. The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the block(s) or step(s) of the functional block diagrams and flowcharts.

Accordingly, blocks or steps of the flowcharts support combinations of means for performing the specified functions, combinations of steps for performing the specified functions and program instruction means for performing the specified functions. It will also be understood that each block or step of the functional block diagrams and flowcharts, and combinations of blocks or steps in the functional block diagrams and flowcharts, can be implemented by special purpose hardware-based computer systems which perform the specified functions or steps, or combinations of special purpose hardware and computer instructions.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system for providing broadcast content comprising:
a content source configured to broadcast content for a plurality of channels; and
at least one terminal configured to receive and consume content for a selected channel x, wherein content for the selected channel is received from the content source, wherein the selected channel is one in a set of ordered channels of broadcast content,
wherein the terminal is configured to change selection from the selected channel x to an adjacent channel x±1 in the set of ordered channels, the selection being changed in a given direction from the selected channel x,
wherein the terminal is configured to receive content for the adjacent channel x±1 in response to the change in selection to the adjacent channel x±1, wherein the terminal is configured to consume content for the adjacent channel x±1 based upon the received content for the adjacent channel x±1,
wherein the terminal is configured to receive content for Y next adjacent channels (x±1)±y, y=1, . . . , Y in buffer memory as content for the adjacent channel is received and consumed, wherein content for the next adjacent channels (x±1)±y is received and stored based upon the direction in which the selection is changed and in response to the change in selection to the adjacent channel, and
wherein the terminal is configured to receive and consume content for the selected channel x, change selection from the selected channel x to the adjacent channel x±1, receive and consume content for the adjacent channel x±1, and receive and store content for the next adjacent channels (x±1)±y at at least one instance, and wherein the adjacent channel x±1 of one instance becomes the selected channel x for a next instance such that x=x±1 from one instance to the next,
wherein the terminal is further configured to initiate a buffer timeout after the change in selection from the selected channel x to the adjacent channel x±1, wherein being configured to initiate the buffer timeout includes being configured to reset the buffer timeout for each subsequent instance of a change in selection, and
wherein the terminal is configured to cease receipt and storage of content for Y next adjacent channels (x±1) ±y, y=1, . . . , Y in buffer memory if the buffer timeout expires before being reset for a subsequent instance of a change in selection.

2. A system according to claim 1, wherein the terminal is configured to receive and store content for the next adjacent channels (x±1)±y such that, if the selection is changed from the adjacent channel x±1 to one of the next adjacent channels (x±1)±y, the terminal is further configured to consume the stored content for the respective next adjacent channel, and thereafter receive and consume content for the respective next adjacent channel.

3. A system according to claim 2, wherein the terminal is configured to receive and store content for the next adjacent channels (x±1)±y such that, if the selection is changed from the adjacent channel x±1 to a channel other than the next adjacent channels (x±1)±y, the terminal is further configured to receive and consume content for the channel other than the next adjacent channels independent of the stored content.

4. An apparatus comprising:
a controller configured to receive and consume content for a selected channel x, wherein content for the selected channel is received from a content source, wherein the selected channel is one in a set of ordered channels of broadcast content,
wherein the controller is configured to change selection from the selected channel x to an adjacent channel x±1 in the set of ordered channels, the selection being changed in a given direction from the selected channel x,
wherein the controller is configured to receive and consume content for the adjacent channel x±1 in response to the change in selection to the adjacent channel x±1,
wherein the controller is configured to receive and store content for Y next adjacent channels (x±1)±y, y=1, ..., Y in a buffer memory as content for the adjacent channel is received and consumed, wherein content for the next adjacent channels (x±1)±y is received and stored based upon the direction in which the selection is changed and in response to the change in selection to the adjacent channel, and
wherein the controller is configured to receive and consume content for the selected channel x, change selection from the selected channel x to the adjacent channel x±1, receive and consume content for the adjacent channel x±1, and receive and store content for the next adjacent channels (x±1)±y at at least one instance, and wherein the adjacent channel x±1 of one instance becomes the selected channel x for a next instance such that x=x±1 from one instance to the next,
wherein the controller is further configured to initiate a buffer timeout after the change in selection from the selected channel x to the adjacent channel x±1, wherein being configured to initiate the buffer timeout includes being configured to reset the buffer timeout for each subsequent instance of a change in selection, and
wherein the controller is configured to cease receipt and storage of content for Y next adjacent channels (x±1)±y, y=1, ..., Y in buffer memory if the buffer timeout expires before being reset for a subsequent instance of a change in selection.

5. An apparatus according to claim 4, wherein the controller is configured to receive and store content for the next adjacent channels (x±1)±y such that, if the selection is changed from the adjacent channel x±1 to one of the next adjacent channels (x±1)±y, the controller is further configured to consume the stored content for the respective next adjacent channel, and thereafter receive and consume content for the respective next adjacent channel.

6. An apparatus according to claim 5, wherein the controller is configured to receive and store content for the next adjacent channels (x±1)±y such that, if the selection is changed from the adjacent channel x±1 to a channel other than the next adjacent channels (x±1) ±y, the controller is further configured to receive and consume content for the channel other than the next adjacent channels independent of the stored content.

7. An apparatus according to claim 4, wherein the controller is further configured to clear the buffer memory if the buffer timeout expires before being reset for a subsequent instance of a change in selection.

8. An apparatus according to claim 4, wherein the controller is further configured to receive and store content for at least one preferred channel in buffer memory, and wherein the at least one preferred channel is defined based upon at least one channel usage statistic.

9. An apparatus according to claim 4, wherein the controller is configured to receive a selection of content for one or more channels scheduled for broadcast at one or more future broadcast times, and present a reminder of an impending broadcast of the selected content before the scheduled broadcast, and wherein the controller is further configured to receive and store the selected content based upon presentation of the reminder of impending broadcast of the respective content.

10. An apparatus according to claim 4, wherein the content source is configured to broadcast content for a broadcast set of n ordered channels,
wherein the controller is configured to alter at least one of the channels in the set of n ordered channels or the ordering of the channels in the set or n ordered channels to thereby form a user-defined set of ≦n ordered channels,
wherein the controller is configured to receive and consume content for a selected channel in the user-defined set of ≦n ordered channels, and
wherein the controller is configured to change selection to an adjacent channel x±1 in the user-defined set of ≦n ordered channels.

11. An apparatus according to claim 4, wherein the content consumed for the adjacent channel x±1 comprises the same content as the content received for the adjacent channel x±1 when the apparatus is authorized to consume the content, and otherwise comprises at least one of an indication or content reflective of the adjacent channel x±1 being an unauthorized channel.

12. An apparatus according to claim 4, wherein the content stored for the next adjacent channels (x±1)±y comprises the same content as the content received for the next adjacent channels (x±1)±y when the apparatus is authorized to consume the content, and otherwise comprises at least one of an indication or content reflective of the next adjacent channels (x±1)±y being unauthorized channels.

13. An apparatus according to claim 4, wherein the controller being capable of receiving and storing content for Y next adjacent channels includes being capable of receiving and storing content for Y next adjacent subscribed channels (x±1)±y, y=1, ..., Y in buffer memory, bypassing at least one next adjacent unsubscribed channel when at least one next adjacent unsubscribed channel is intervening between the adjacent channel and the next adjacent subscribed channels.

14. A method comprising:
receiving and consuming content for a selected channel x, wherein content for the selected channel is received from a content source, and wherein the selected channel is one in a set of ordered channels of broadcast content;
changing channel selection from the selected channel x to an adjacent channel x±1 in the set of ordered channels, the channel selection being changed in a given direction from the selected channel x;
receiving content for the adjacent channel x±1 in response to changing channel selection to the adjacent channel x±1;

consuming content for the adjacent channel x±1 based upon the received content for the adjacent channel x±1;

receiving content for Y next adjacent channels (x±1)±y, y±1, . . . , Y in buffer memory as content for the adjacent channel is received, wherein content for the at least one next adjacent channel is received based upon the direction in which the channel selection is changed and in response to changing channel selection to the adjacent channel; and storing content for the next adjacent channels (x±1)±y based upon the received content for the next adjacent channels (x±1)±y, wherein the receiving and consuming content for the selected channel x, changing selection from the selected channel x to the adjacent channel x±1, receiving and consuming content for the adjacent channel x±1, and receiving and storing content for the next adjacent channels (x±1)±y steps occur at at least one instance, wherein the adjacent channel x ±1 of one instance becomes the selected channel x for a next instance such that x=x±1 from one instance to the next, and wherein the method further comprises:

initiating a buffer timeout after changing selection from the selected channel x to the adjacent channel x±1, wherein initiating the buffer timeout includes resetting the buffer timeout for each subsequent instance of changing selection, wherein receiving and storing content for the next adjacent channels includes ceasing receipt and storage of content for Y next adjacent channels (x±1)±y, y=1, . . . , Y in buffer memory if the buffer timeout expires before being reset for a subsequent instance of changing selection.

15. A method according to claim 14 further comprising:
clearing the buffer memory if the buffer timeout expires before being reset for a subsequent instance of changing selection.

16. A computer program product comprising a computer-readable storage medium of an apparatus having computer-readable program code portions stored therein, the computer-readable program code portions comprising:

a first executable portion configured to receive and consume content for a selected channel x, wherein the content for the selected channel is received from a content source, and wherein the selected channel is one in a set of ordered channels of broadcast content;

a second executable portion configured to change selection from the selected channel x to an adjacent channel x±1 in the set of ordered channels, the selection being changed in a given direction from the selected channel x;

a third executable portion configured to receive and consume content for the adjacent channel x±1 in response to the change in selection to the adjacent channel x±1; and a fourth executable portion configured to receive and store content for Y next adjacent channels (x±1)±y, y=1, . . . , Y in buffer memory as content for the adjacent channel is received and consumed, wherein content for the at least one next adjacent channel is received and stored based upon the direction in which the selection is changed and in response to the change in selection to the adjacent channel, wherein the first, second, third and fourth executable portions are configured to receive and consume content for the selected channel x, change selection from the selected channel x to the adjacent channel x±1, receive and consume content for the adjacent channel x±1, and receive and store content for the next adjacent channels (x±1)±y, respectively, at at least one instance, wherein the adjacent channel x±1 of one instance becomes the selected channel x for a next instance such that x=x±1 from one instance to the next, and wherein the computer-readable program code portions further comprise:

a fifth executable portion configured to initiate a buffer timeout after the change in selection from the selected channel x to the adjacent channel x±1, the fifth executable portion being configured to initiate the buffer timeout includes being configured to reset the buffer timeout for each subsequent instance of a change in selection, wherein the fourth executable portion is configured to cease receipt and storage of content for Y next adjacent channels (x±1)±y, y=1, . . . , Y in buffer memory if the buffer timeout expires before being reset for a subsequent instance of a change in selection.

17. A computer program product according to claim 16, wherein the computer-readable program code portions further comprise:

a fifth executable portion configured to consume the stored content for one of the next adjacent channels (x±1)±y; and a sixth executable portion configured to thereafter receive and consume content for the respective next adjacent channel, wherein the fifth and sixth executable portions are configured to consume the stored content and receive and consume content, respectively, if the selection is changed from the adjacent channel x±1 to the respective next adjacent channel (x±1)±y.

18. A computer program product according to claim 17, wherein the sixth executable portion is configured to receive and consume content for a channel other than the next adjacent channels (x±1)±y independent of the fifth executable portion being configured to consume stored content if the selection is changed from the adjacent channel x±1 to the channel other than the next adjacent channels.

19. A computer program product according to claim 16, wherein the computer-readable program code portions further comprise:

a sixth executable portion configured to clear the buffer memory if the buffer timeout expires before being reset for a subsequent instance of a change in selection.

20. A computer program product according to claim 16, wherein the fourth executable portion is further configured to receive and store content for at least one preferred channel in buffer memory, and wherein the at least one preferred channel is defined based upon at least one channel usage statistic.

21. A computer program product according to claim 16, wherein the computer-readable program code portions further comprise:

a fifth executable portion configured to receive a selection of content for one or more channels scheduled for broadcast at one or more future broadcast times; and a sixth executable portion configured to present a reminder of an impending broadcast of the selected content before the scheduled broadcast, wherein the fourth executable portion is further configured to receive and store the selected content based upon presentation of the reminder of impending broadcast of the respective content.

22. A computer program product according to claim 16, wherein the content source is configured to broadcast content for a broadcast set of n ordered channels, and wherein the computer-readable program code portions further comprise:

a fifth executable portion configured to alter at least one of the channels in the set of n ordered channels or the ordering of the channels in the set or n ordered channels to thereby form a user-defined set of $\leq$n ordered channels, wherein the first executable portion is configured to receive and consume content for a selected channel in the user-defined set of $\leq$n ordered channels, and wherein the second executable portion is configured to change channels to an adjacent channel x±1 in the user-defined set of $\leq$n ordered channels.

23. A computer program product according to claim 16, wherein the content consumed for the adjacent channel x±1 comprises the same content as the content received for the adjacent channel x±1 when the apparatus is authorized to consume the content, and otherwise comprises at least one of an indication or content reflective of the adjacent channel x±1 being an unauthorized channel.

24. A computer program product according to claim 16, wherein the content stored for the next adjacent channels (x±1)±y comprises the same content as the content received for the next adjacent channels (x±1)±y when the apparatus is authorized to consume the content, and otherwise comprises at least one of an indication or content reflective of the next adjacent channels (x±1)±y being unauthorized channels.

25. A computer program product according to claim 16, wherein the fourth executable portion being configured to receive and store content for Y next adjacent channels includes being configured to receive and store content for Y next adjacent subscribed channels (x±1)±y, y=1, . . . , Y in buffer memory, bypassing at least one next adjacent unsubscribed channel when at least one next adjacent unsubscribed channel is intervening between the adjacent channel and the next adjacent subscribed channels.

* * * * *

UNITED STATES PATENT AND TRADEMARK OFFICE
CERTIFICATE OF CORRECTION

PATENT NO. : 7,490,341 B2 Page 1 of 1
APPLICATION NO. : 11/146876
DATED : February 10, 2009
INVENTOR(S) : Kiiskinen et al.

It is certified that error appears in the above-identified patent and that said Letters Patent is hereby corrected as shown below:

Column 4,
Lines 40, 42, and 45, "$\leqq n$" should read --$\leq n$--.

Column 29,
Lines 6, 10, and 13, "$\leqq n$" should read --$\leq n$--.

Signed and Sealed this

Fifth Day of May, 2009

JOHN DOLL
*Acting Director of the United States Patent and Trademark Office*